US012802352B2

(12) United States Patent
Ma et al.

(10) Patent No.: US 12,802,352 B2
(45) Date of Patent: Nov. 17, 2026

(54) RENDERING METHOD AND ELECTRONIC DEVICE

(71) Applicant: HUAWEI TECHNOLOGIES CO., LTD., Shenzhen (CN)

(72) Inventors: Xiang Ma, Moscow (RU); Haitao Yang, Shenzhen (CN); YiZhi Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 18/827,338

(22) Filed: Sep. 6, 2024

(65) Prior Publication Data

US 2025/0005857 A1 Jan. 2, 2025

Related U.S. Application Data

(63) Continuation of application No. PCT/CN2023/078241, filed on Feb. 24, 2023.

(30) Foreign Application Priority Data

Mar. 7, 2022 (CN) ........................ 202210222772.4

(51) Int. Cl.
*G06T 17/00* (2006.01)
*A63F 13/33* (2014.01)
*G06T 15/04* (2011.01)

(52) U.S. Cl.
CPC .............. *G06T 17/00* (2013.01); *G06T 15/04* (2013.01); *G06T 2210/08* (2013.01); *G06T 2210/36* (2013.01); *G06T 2210/56* (2013.01)

(58) Field of Classification Search
CPC ....... G06T 17/00; G06T 17/205; G06T 9/001; G06T 9/40; G06T 5/006; G06T 5/70;
(Continued)

(56) References Cited

U.S. PATENT DOCUMENTS 9,704,270 B1 7/2017 Main et al.
10,916,053 B1 * 2/2021 Katzman .................. G06T 7/50
(Continued)

FOREIGN PATENT DOCUMENTS

CN 112368766 A 2/2021

OTHER PUBLICATIONS

"OpenGL, the graphics rendering pipeline," [online]https://blog.csdn.net/zhengzhengwang/article/details/115430821, total 16 pages. (Apr. 4, 2021). With English translation.
(Continued)

*Primary Examiner* — Wesner Sajous
(74) *Attorney, Agent, or Firm* — Leydig, Voit & Mayer, Ltd.

(57) ABSTRACT

A rendering method and an electronic device are provided. The method includes: first, obtaining channel feedback information of an encoded transmission channel, wherein the encoded transmission channel is used to transmit an encoded bitstream corresponding to a rendered image; subsequently, determining, from a plurality of groups of preset rendering input information, rendering input information corresponding to the channel feedback information, wherein complexity of the plurality of groups of preset rendering input information is different; then, performing rendering
(Continued)

based on the rendering input information corresponding to the channel feedback information, to obtain the rendered image, wherein content complexity of the obtained rendered image is associated with complexity of the rendering input information corresponding to the channel feedback information.

20 Claims, 7 Drawing Sheets

(58) Field of Classification Search
CPC ....... G06T 5/80; G06T 15/04; G06T 2210/08; G06T 2210/36; G06T 2210/56; G06T 2207/10028; G06T 2207/10016; G06T 2207/10024; G06T 2207/30221; G06T 2207/30241; G06T 7/246; G06T 7/254; G06T 7/269; G06T 7/292; H04N 19/597; H04N 19/184; H04N 19/70; H04N 19/51; H04N 19/107; H04N 19/119; H04N 19/147; H04N 19/15; H04N 19/176; H04N 19/43; H04N 19/50; H04N 19/521; H04N 19/82–89; H04N 23/695; H04N 23/95; H04N 23/661; H04N 23/663; H04N 13/204; H04N 13/275; H04N 13/239; H04N 13/257; H04N 13/161; H04N 13/194; H04N 13/189; H04N 25/745; H04N 5/772; H04N 5/907; H04N 5/765; H04N 5/781; H04N 5/85; H04N 9/804; H04N 9/7921
See application file for complete search history.

(56) References Cited

U.S. PATENT DOCUMENTS

| | | | | |
|---|---|---|---|---|
| 11,297,346 | B2 * | 4/2022 | Chou | H04N 19/51 |
| 11,348,283 | B2 * | 5/2022 | Najaf-Zadeh | H04N 19/85 |
| 11,593,967 | B2 * | 2/2023 | Najaf-Zadeh | G06T 17/205 |
| 11,665,372 | B2 * | 5/2023 | Faramarzi | H04N 19/88<br>375/240.26 |
| 12,100,184 | B2 * | 9/2024 | Najaf-Zadeh | G06T 17/205 |
| 2009/0278842 | A1 * | 11/2009 | Peterfreund | H04N 19/124<br>345/419 |
| 2013/0307847 | A1 * | 11/2013 | Dey | H04N 19/102<br>345/419 |
| 2018/0357810 | A1 * | 12/2018 | Young | G06T 15/005 |
| 2021/0209809 | A1 * | 7/2021 | Najaf-Zadeh | G06T 9/40 |
| 2023/0169693 | A1 * | 6/2023 | Najaf-Zadeh | G06T 17/205 |
| 2024/0046526 | A1 * | 2/2024 | Najaf-Zadeh | G06T 5/80 |

OTHER PUBLICATIONS

“Rendering,” [online] https://zh.wikipedia.org/wiki/%E6%B8%B2%E6%9F%93, total 20 pages (Latest edited on Jul. 7, 2024). With English translation.

* cited by examiner

RENDERING METHOD AND ELECTRONIC DEVICE

CROSS-REFERENCE TO RELATED APPLICATIONS

This application is a continuation of International Application No. PCT/CN2023/078241, filed on Feb. 24, 2023, which claims priority to Chinese Patent Application No. 202210222772.4, filed on Mar. 7, 2022. The disclosures of the aforementioned applications are hereby incorporated by reference in their entireties.

TECHNICAL FIELD

Embodiments of this application relate to the field of graphics processing, and in particular, to a rendering method and an electronic device.

BACKGROUND

Currently, cloud rendering is used in many scenarios (such as a cloud game, XR (Extended Reality), and movie special effect). To be specific, rendering is completed on the cloud, and then a video image obtained through rendering is encoded into a bitstream and transmitted to a device side, and the device side decodes the received bitstream. In this way, the device side can obtain high-quality rendered content.

In scenarios (such as a cloud game and XR) with high requirements on latency, when a bit rate of an encoded bitstream becomes higher or channel bandwidth becomes narrower due to complex content of a video image, problems such as delay, frame freezing, and frame loss of a video on the device side are caused, or image quality is reduced.

SUMMARY

To resolve the foregoing technical problems, embodiments of this application provide a rendering method and an electronic device. The method can ensure video image quality while ensuring video smoothness.

According to a first aspect, an embodiment of this application provides a rendering method. The method includes: first, obtaining channel feedback information of an encoded transmission channel, where the encoded transmission channel is used to transmit an encoded bitstream corresponding to a rendered image; subsequently, determining, from a plurality of groups of preset rendering input information, rendering input information corresponding to the channel feedback information, where complexity of the plurality of groups of preset rendering input information is different; then, performing rendering based on the rendering input information corresponding to the channel feedback information, to obtain the rendered image. Content complexity of the obtained rendered image is associated with complexity of the rendering input information corresponding to the channel feedback information. To be specific, higher complexity of the rendering input information corresponding to the channel feedback information indicates higher content complexity of the obtained rendered image. Lower complexity of the rendering input information corresponding to the channel feedback information indicates lower content complexity of the obtained rendered image. In addition, higher content complexity of the image indicates a larger corresponding encoded bitstream, and lower content complexity of the image indicates a smaller corresponding encoded bitstream. In this way, when channel quality decreases, the content complexity of the image is reduced by reducing the complexity of the rendering input information, so that bandwidth required for the encoded bitstream for transmitting the rendered image can be reduced. Further, subjective quality of an original image and video smoothness can be maintained (or maintained as much as possible). In this way, a video image watched by a user does not suddenly become blurry or freeze. This improves user experience. When the channel quality is enhanced, larger bandwidth may be provided to transmit a bitstream, and further, content complexity of an image may be restored or partially restored (or enhanced) by restoring or partially restoring (or enhancing) the complexity of the rendering input information.

For example, after the rendered image is obtained, the rendered image may be encoded to obtain the encoded bitstream corresponding to the rendered image. Then, the encoded bitstream may be transmitted through the encoded transmission channel, to transmit the encoded bitstream to a receive end. Then, the receive end decodes the encoded bitstream to obtain and display a corresponding decoded image. In this way, when a channel status changes, a video image displayed at the receive end does not suddenly become blurry or freeze.

For example, each group of preset rendering input information may include at least one of the following: a preset three-dimensional object model, a preset motion model, a preset particle model, or a preset texture. It should be understood that the preset rendering input information may further include other input information that affects the content complexity of the image. This is not limited in this application.

For example, when the preset rendering input information is a model, the preset rendering input information has a plurality of corresponding parameters. For example, when the preset rendering input information is the preset three-dimensional object model, a parameter corresponding to the preset three-dimensional object model may include a quantity of vertices/faces. For another example, when the preset rendering input information is the preset motion model, a parameter corresponding to the preset motion model may include a physical simulation unit granularity. For still another example, when the preset rendering input information is the preset particle model, rendering input information corresponding to the preset particle model may include various particle behavior parameters. In this case, complexity of the preset rendering input information may be determined based on the parameter corresponding to the preset rendering input information. When the preset rendering input information is an image, the complexity of the preset rendering input information may be determined based on image texture complexity.

For example, the content complexity of the image may be a comprehensive representation of factors such as fineness of object details in the image, complexity of object surface texture in the image, motion complexity of an object in the image, and particle motion complexity in the image (this factor exists when the image includes particle special effect).

For example, the motion complexity of the object in the image may be determined based on motion fineness of the object. Higher motion fineness of the object in the image indicates higher complexity of the object in the corresponding image. On the contrary, lower motion fineness of the object in the image indicates lower complexity of the object in the corresponding image. The motion fineness may refer to a size or a quantity of pixels of a region in which a similar motion or same motion is performed in a local region of an image.

For example, for particle special effect like blooming fireworks or burning flames, the particle motion complexity may be determined based on a particle behavior parameter. The particle behavior parameter may include but is not limited to: a particle generation speed (used to determine a quantity of particles generated per unit time), a particle initial speed vector (used to describe a motion direction of a particle at each moment), a particle life (that is, a life cycle of particle annihilation), a particle color, a particle size, particle transparency, a change of a particle in a life cycle, and another parameter.

For example, it is assumed that there are two video sequences obtained through rendering for a same scene, and for two frames of images corresponding to a same moment in the two video sequences: If complexity of object surface textures in the two frames of images is the same, motion complexity of objects in the images is the same, and particle motion complexity is the same, an image with higher fineness of object details indicates higher content complexity. If fineness of object details in the two images is the same, the motion complexity of the objects in the images is the same, and the particle motion complexity is the same, an image with higher complexity of object surface texture indicates higher content complexity. If the fineness of the object details in the two images is the same, the complexity of the object surface textures is the same, and the particle motion complexity is the same, an image with higher motion complexity of an object in the images indicates higher content complexity. If the fineness of the object details in the two images is the same, the complexity of the object surface textures is the same, and the motion complexity of the objects in the images is the same, an image with higher particle motion complexity indicates higher content complexity.

According to the first aspect, the rendering input information corresponding to the channel feedback information includes at least one of the following: a three-dimensional object model, a motion model, a particle model, or a texture.

According to the first aspect or any implementations of the first aspect, when each group of preset rendering input information includes the preset three-dimensional object model, the determining, from a plurality of groups of preset rendering input information, rendering input information corresponding to the channel feedback information includes: determining, from a plurality of preset three-dimensional object models, a three-dimensional object model corresponding to the channel feedback information. The plurality of preset three-dimensional object models correspond to a same object, and complexity of the plurality of preset three-dimensional object models is different. The performing rendering based on the rendering input information corresponding to the channel feedback information, to obtain the rendered image includes: performing rendering based on the three-dimensional object model corresponding to the channel feedback information, to obtain the rendered image. The content complexity of the rendered image is associated with complexity of the three-dimensional object model corresponding to the channel feedback information. To be specific, higher complexity of the three-dimensional object model corresponding to the channel feedback information indicates higher fineness of object details in the rendered image and higher content complexity of the rendered image. Lower complexity of the three-dimensional object model corresponding to the channel feedback information indicates lower fineness of object details in the rendered image and lower content complexity of the rendered image.

In this way, rendering is performed based on the three-dimensional object model whose complexity corresponds to a channel status, so that the fineness of the object details in the rendered image adapts to the channel status, and a size of the encoded bitstream corresponding to the rendered image adapts to the channel status. This ensures subjective image, quality and video smoothness of a video, and improves user experience.

In addition, when the complexity of the three-dimensional object model corresponding to the channel feedback information is lower, a quantity of faces/vertices that need to be rendered is smaller, and further, rendering complexity is lower, and a rendering speed is higher. When the complexity of the three-dimensional object model corresponding to the channel feedback information is higher, object details in the rendered image are finer, so that object details in the image can be increased. This improves user experience.

According to the first aspect or any implementation of the first aspect, the preset three-dimensional object model is a face model, and complexity of the preset three-dimensional object model is determined based on a quantity of faces of the preset three-dimensional object model. Alternatively, the preset three-dimensional object model is a point cloud model, and complexity of the preset three-dimensional object model is determined based on a quantity of vertices of the preset three-dimensional object model.

For example, when the preset three-dimensional object model is the point cloud model (in other words, the preset three-dimensional object model is formed by a point cloud), the complexity of the preset three-dimensional object model may be determined based on the quantity of vertices of the preset three-dimensional object model. For example, the quantity of vertices of the preset three-dimensional object model represents the complexity of the preset three-dimensional object model. For another example, a complexity level is determined based on the quantity of vertices of the preset three-dimensional object model, and the complexity level represents the complexity of the preset three-dimensional object model. This is not limited in this application. A larger quantity of vertices of the preset three-dimensional object model indicates higher complexity of the preset three-dimensional object model and finer preset three-dimensional object model. On the contrary, a smaller quantity of vertices of the preset three-dimensional object model indicates lower complexity of the preset three-dimensional object model and coarser preset three-dimensional object model.

For example, when the preset three-dimensional object model is the face model (in other words, the preset three-dimensional object model is formed by faces), the complexity of the preset three-dimensional object model may be determined based on the quantity of faces. For example, the quantity of faces of the preset three-dimensional object model represents the complexity of the preset three-dimensional object model. For another example, a complexity level is determined based on the quantity of faces of the preset three-dimensional object model, and the complexity level represents the complexity of the preset three-dimensional object model. This is not limited in this application. A larger quantity of faces of the preset three-dimensional object model indicates higher complexity of the preset three-dimensional object model and finer preset three-dimensional object model. On the contrary, a smaller quantity of faces of the preset three-dimensional object model indicates lower complexity of the preset three-dimensional object model and coarser preset three-dimensional object model.

According to the first aspect or any implementation of the first aspect, when each group of preset rendering input information includes the preset motion model, the determining, from a plurality of groups of preset rendering input information, rendering input information corresponding to the channel feedback information includes: determining, from a plurality of preset motion models, a motion model corresponding to the channel feedback information. The plurality of preset motion models correspond to a same motion process, and complexity of the plurality of preset motion models is different. The performing rendering based on the rendering input information corresponding to the channel feedback information, to obtain the rendered image includes: performing rendering based on the motion model corresponding to the channel feedback information, to obtain the rendered image. The content complexity of the rendered image is associated with complexity of the motion model corresponding to the channel feedback information. To be specific, higher complexity of the motion model corresponding to the channel feedback information indicates higher motion complexity of an object in the rendered image and higher content complexity of the rendered image. Lower complexity of the motion model corresponding to the channel feedback information indicates lower motion complexity of the object in the rendered image and lower content complexity of the rendered image.

In this way, rendering is performed based on the motion model whose complexity corresponds to a channel status, so that motion complexity of an object in a rendered video sequence adapts to the channel status. When motion complexity of an object in an image is lower, inter time domain correlation is higher, inter prediction is easier in an encoding process, compression is easier, and a bit rate of an encoded bitstream is lower. Therefore, a size of an encoded bitstream corresponding to the rendered image adapts to the channel status. This ensures subjective image quality and video smoothness of the video, and improves user experience.

In addition, when the complexity of the motion model corresponding to the channel feedback information is lower, a quantity of physical simulation units that require physical simulation is smaller, rendering complexity is lower, and a rendering speed is higher. When the complexity of the motion model corresponding to the channel feedback information is higher, the motion complexity of the object in the rendered image is higher, and a motion process of, the object displayed in a corresponding video sequence is more realistic. This improves user experience.

According to the first aspect or any implementation of the first aspect, complexity of the preset motion model is determined based on a physical simulation unit granularity of the preset motion model, and the physical simulation unit granularity is a granularity at which a three-dimensional object model is divided into units used for physical simulation.

For example, the preset motion model defines the physical simulation unit granularity. The physical simulation unit granularity is a granularity at which the three-dimensional object model is divided into units used for physical simulation, and a minimum value of the physical simulation unit granularity may be a face or a vertex. For example, the complexity of the preset motion model may be determined based on the physical simulation unit granularity. For example, the complexity of the preset motion model is represented by using the physical simulation unit granularity of the preset motion model. For another example, the complexity level is determined based on the physical simulation unit granularity of the preset motion model, and the complexity level represents the complexity of the preset motion model. This is not limited in this application. For example, a larger physical simulation unit granularity of the preset motion model indicates lower complexity of the preset motion model. On the contrary, a smaller physical simulation unit granularity of the preset motion model indicates higher complexity of the preset motion model. A larger quantity of faces/vertices included in the physical simulation unit granularity indicates a larger physical simulation unit.

For example, a larger physical simulation unit granularity indicates lower motion fineness of the object in the image. On the contrary, a smaller physical simulation unit granularity indicates higher motion fineness of the object in the image.

According to the first aspect or any implementation of the first aspect, when each group of preset rendering input information includes the preset particle model, the determining, from a plurality of groups of preset rendering input information, rendering input information corresponding to the channel feedback information includes: determining, from a plurality of preset particle models, a particle model corresponding to the channel feedback information. The plurality of preset particle models correspond to same particle special effect, and complexity of the plurality of preset particle models is different. The performing rendering based on the rendering input information corresponding to the channel feedback information, to obtain the rendered image includes: performing particle rendering based on the particle model corresponding to the channel feedback information, to obtain the rendered image. The content complexity of the rendered image is associated with complexity of the particle model corresponding to the channel feedback information. To be specific, higher complexity of the particle model corresponding to the channel feedback information indicates higher content complexity of the rendered image. Lower complexity of the particle model corresponding to the channel feedback information indicates lower content complexity of the rendered image.

In this way, particle rendering is performed based on a particle model whose complexity adapts to a channel status, so that particle motion complexity in the rendered image adapts to the channel status, and a size of an encoded bitstream corresponding to the rendered image adapts to the channel status. This ensures subjective image quality and video smoothness of a video, and improves user experience.

In addition, when model complexity of the particle model corresponding to the channel feedback information is lower, rendering complexity is lower, and a rendering speed is higher. When the model complexity of the particle model corresponding to the channel feedback information is higher, the particle motion complexity in the rendered image is higher, and a particle motion process displayed in a corresponding video sequence is more realistic, so that particle special effect is more realistic. This improves user experience.

According to the first aspect or any implementation of the first aspect, complexity of the preset particle model is determined based on a particle behavior parameter of the preset particle model.

According to the first aspect or any implementation of the first aspect, when each group of preset rendering input information includes the preset texture, the determining, from a plurality of groups of preset rendering input information, rendering input information corresponding to the channel feedback information includes: determining, from a plurality of preset textures, a texture corresponding to the channel feedback information. The plurality of preset textures correspond to a same object, and texture complexity of the plurality of preset textures is different. The performing rendering based on the rendering input information corresponding to the channel feedback information, to obtain the rendered image includes: performing rendering based on the texture corresponding to the channel feedback information, to obtain the rendered image. The content complexity of the rendered image is associated with texture complexity of the texture corresponding to the channel feedback information. To be specific, higher complexity of the texture corresponding to the channel feedback information indicates higher texture complexity of an object surface in the rendered image and higher content complexity of the rendered image. Lower complexity of the texture corresponding to the channel feedback information indicates lower texture complexity of the object surface in the rendered image and lower content complexity of the rendered image.

In this way, rendering is performed based on the texture whose complexity adapts to a channel status, so that the texture complexity of the object surface in the rendered image adapts to the channel status, and a size of an encoded bitstream corresponding to the rendered image adapts to the channel status. This ensures subjective image quality and video smoothness of a video, and improves user experience.

In addition, when the texture complexity of the texture corresponding to the channel feedback information is lower, rendering complexity is lower, and a rendering speed is higher. When the texture complexity of the texture corresponding to the channel feedback information is higher, complexity of a surface texture of the object in the rendered image is higher. Further, details of a texture of the object in the image can be increased, so that the object in the image is more realistic. This improves user experience.

For example, complexity of the preset texture may be texture complexity. For example, texture complexity of a preset texture may be determined in a plurality of manners. For example, a variance corresponding to an intensity histogram of the preset texture is calculated, and the variance is used to determine the texture complexity of the preset texture (for example, the variance of the preset texture represents the complexity of the preset texture; for another example, a complexity level is determined based on the variance of the preset texture, and the complexity level represents the complexity of the preset texture, and this is not limited in this application). For another example, a gradient of the preset texture is calculated, and the calculated gradient is used to determine the texture complexity of the preset texture (for example, the gradient of the preset texture represents the complexity of the preset texture; for another example, a complexity level is determined based on the gradient of the preset texture, and the complexity level represents the complexity of the preset texture, and this is not limited in this application). It should be understood that the texture complexity of the preset texture may alternatively be determined in another manner. This is not limited in this application.

According to the first aspect or any implementation of the first aspect, the method further includes: determining a channel status change degree based on the channel feedback information; and when the channel status change degree is greater than a preset change threshold, performing the step of determining, from a plurality of groups of preset rendering input information, rendering input information corresponding to the channel feedback information. In this way, a switching frequency of the rendering input information can be reduced, and a quantity of preset rendering input information can be reduced.

According to the first aspect or any implementation of the first aspect, the channel feedback information includes at least one of the following: network transmission bandwidth; a network transmission delay; a network jitter value; and a network packet loss rate.

According to a second aspect, an embodiment of this application provides a rendering apparatus. The apparatus includes: a channel information obtaining module, configured to obtain channel feedback information of an encoded transmission channel, where the encoded transmission channel is used to transmit an encoded bitstream corresponding to a rendered image;

an input information determining module, configured to determine, from a plurality of groups of preset rendering input information, rendering input information corresponding to the channel feedback information, where complexity of the plurality of groups of preset rendering input information is different; and a rendering module, configured to perform rendering based on the rendering input information corresponding to the channel feedback information, to obtain the rendered image, where content complexity of the rendered image is associated with complexity of the rendering input information corresponding to the channel feedback information.

According to a second aspect, the rendering input information includes at least one of the following: a three-dimensional object model, a motion model, a particle model, or a texture.

According to the second aspect or any implementation of the second aspect, the input information determining module is configured to: when each group of preset rendering input information includes a preset three-dimensional object model, determine, from a plurality of preset three-dimensional object models, a three-dimensional object model corresponding to the channel feedback information. The plurality of preset three-dimensional object models correspond to a same object, and complexity of the plurality of preset three-dimensional object models is different.

The rendering module is configured to perform rendering based on the three-dimensional object model corresponding to the channel feedback information, to obtain the rendered image. The content complexity of the rendered image is associated with complexity of the three-dimensional object model corresponding to the channel feedback information.

According to the second aspect or any implementation of the second aspect, the preset three-dimensional object model is a face model, and complexity of the preset three-dimensional object model is determined based on a quantity of faces of the preset three-dimensional object model. Alternatively, the preset three-dimensional object model is a point cloud model, and complexity of the preset three-dimensional object model is determined based, on a quantity of vertices of the preset three-dimensional object model.

According to the second aspect or any implementation of the second aspect, the input information determining module is configured to: when each group of preset rendering input information includes a preset motion model, determine, from a plurality of preset motion models, a motion model corresponding to the channel feedback information. The plurality of preset motion models correspond to a same motion process, and complexity of the plurality of preset motion models is different. The rendering module is configured to perform rendering based on the motion model corresponding to the channel feedback information, to obtain the rendered image. The content complexity of the rendered image is associated with complexity of the motion model corresponding to the channel feedback information.

According to the second aspect or any implementation of the second aspect, complexity of the preset motion model is determined based on a physical simulation unit granularity of the preset motion model, and the physical simulation unit granularity is a granularity at which a three-dimensional object model is divided into units used for physical simulation.

According to the second aspect or any implementation of the second aspect, the input information determining module is configured to: when each group of preset rendering input information includes a preset particle model, determine, from a plurality of preset particle models, a particle model corresponding to the channel feedback information. The plurality of preset particle models correspond to same particle special effect, and complexity of the plurality of preset particle models is different. The rendering module is configured to perform particle rendering based on the particle model corresponding to the channel feedback information, to obtain the rendered image. The content complexity of the rendered image is associated with complexity of the particle model corresponding to the channel feedback information.

According to the second aspect or any implementation of the second aspect, complexity of the preset particle model is determined based on a particle behavior parameter of the preset particle model.

According to the second aspect or any implementation of the second aspect, the input information determining module is configured to: when each group of preset rendering input information includes a preset texture, determine, from a plurality of preset textures, a texture corresponding to the channel feedback information. The plurality of preset textures correspond to a same object, and texture complexity of the plurality of preset textures is different. The rendering module is configured to perform rendering based on the texture, corresponding to the channel feedback information, to obtain the rendered image. The content complexity of the rendered image is associated with texture complexity of the texture corresponding to the channel feedback information.

According to the second aspect or any implementation of the second aspect, the apparatus further includes a change degree determining module, configured to determine a channel status change degree based on the channel feedback information. The input information determining module is configured to: when the channel status change degree is greater than a preset change threshold, determine, from the plurality of groups of preset rendering input information, the rendering input information corresponding to the channel feedback information.

According to the second aspect or any implementation of the second aspect, the channel feedback information includes at least one of the following: network transmission bandwidth; a network transmission delay; a network jitter value; or a network packet loss rate.

The second aspect and any implementation of the second aspect respectively correspond to the first aspect and any implementation of the first aspect. For technical effect corresponding to the second aspect and any implementation of the second aspect, refer to technical effect corresponding to the first aspect and any implementation of the first aspect. Details are not described herein again.

According to a third aspect, an embodiment of this application provides an electronic device, including a memory and a processor. The memory is coupled to the processor. The memory stores program instructions. When the program instructions are executed by the processor, the electronic device is enabled to perform the rendering method according to the first aspect or any possible implementation of the first aspect.

The third aspect and any implementation of the third aspect respectively correspond to the first aspect and any implementation of the first aspect. For technical effect corresponding to the third aspect and any implementation of the third aspect, refer to technical effect corresponding to the first aspect and any implementation of the first aspect. Details are not described herein again.

According to a fourth aspect, an embodiment of this application provides a chip, including one or more interface circuits and one or more processors. The interface circuit is configured to receive a signal from a memory of an electronic device, and send the signal to the processor. The signal includes computer instructions stored in the memory. When the processor executes the computer instructions, the electronic device is enabled to perform the rendering method according to the first aspect or any possible implementation of the first aspect.

The fourth aspect and any implementation of the fourth aspect respectively correspond to the first aspect and any implementation of the first aspect. For technical effect corresponding to the fourth aspect and any implementation of the fourth aspect, refer to technical effect corresponding to the first aspect and any implementation of the first aspect. Details are not described herein again.

According to a fifth aspect, an embodiment of this application provides a computer-readable storage medium. The computer-readable storage medium stores a computer program. When the computer program is run on a computer or a processor, the computer or the processor is enabled to perform the rendering method according to the first aspect or any possible implementation of the first aspect.

The fifth aspect and any implementation of the fifth aspect respectively correspond to the first aspect and any implementation of the first aspect. For technical effect corresponding to the fifth aspect and any implementation of the fifth aspect, refer to technical effect corresponding to the first aspect and any implementation of the first aspect. Details are not described herein again.

According to a sixth aspect, an embodiment of this application provides a computer program product. The computer program product includes a software program. When the software program is executed by a computer or a processor, the computer or the processor is enabled to perform the rendering method according to the first aspect or any possible implementation of the first aspect.

The sixth aspect and any implementation of the sixth aspect respectively correspond to the first aspect and any implementation of the first aspect. For technical effect corresponding to the sixth aspect and any implementation of the sixth aspect, refer to technical effect corresponding to the first aspect and any implementation of the first aspect. Details are not described herein again.

DESCRIPTION OF EMBODIMENTS

The following clearly and completely describes technical solutions in embodiments of this application with reference to accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first target object, a second target object, and the like are used for distinguishing between different target objects, but are not used for describing a specific order of the target objects.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In descriptions of embodiments of this application, unless otherwise stated, "a plurality of" means two or more than two. For example, a plurality of processing units mean, two or more processing units, and a plurality of systems mean two or more systems.

Embodiments of this application may be applied to a scenario in which cloud rendering needs to be performed, for example, an AR (Augmented Reality) scenario, a VR (Virtual Reality) scenario, an XR scenario, a cloud exhibition scenario, a cloud classroom scenario, a cloud Karaoke scenario, a cloud concert scenario, a cloud game scenario, or a content production scenario (including film special effect production, television special effect production, and the like). This is not limited in embodiments of this application. In this embodiment of this application, the cloud game scenario is used as an example for description.

Figure 1A:
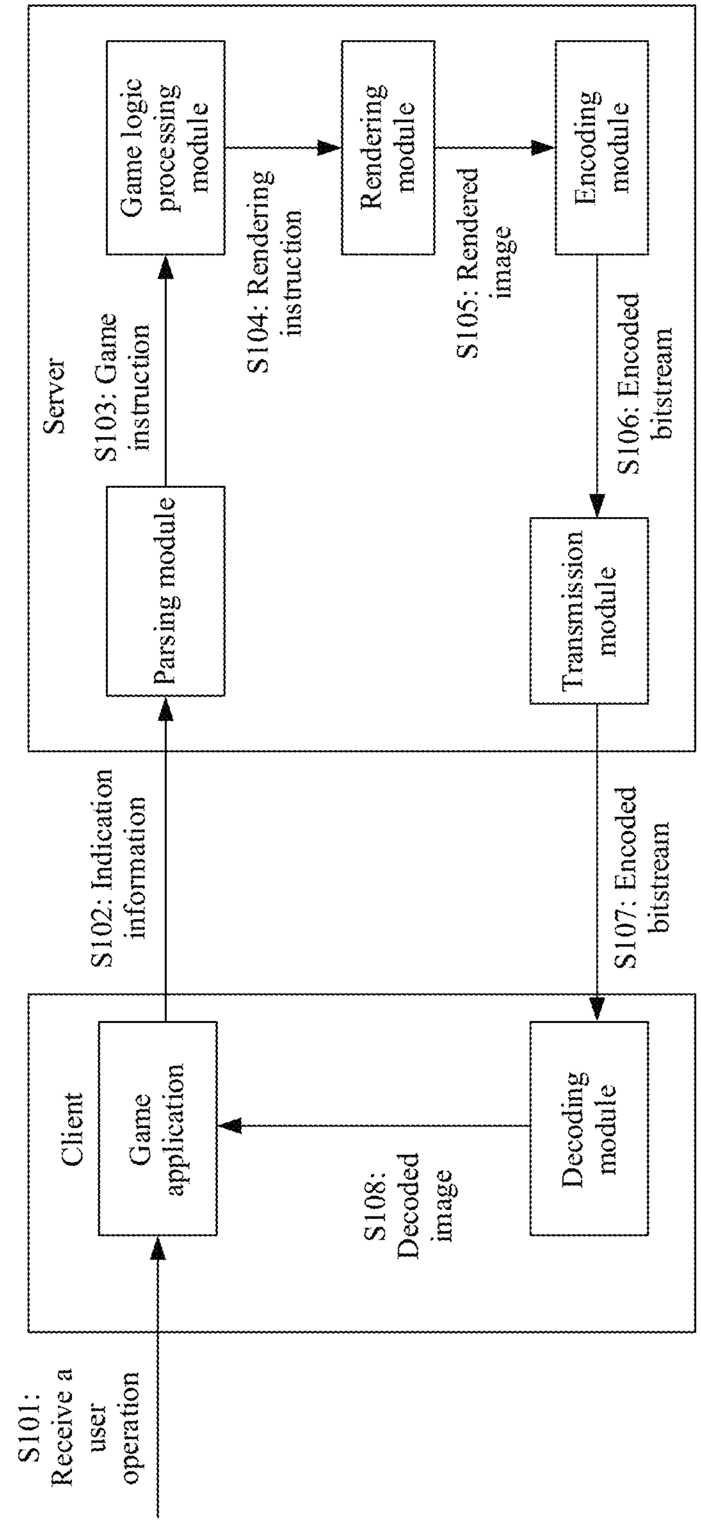
FIG. 1*a* is a diagram of an example of an application scenario.

FIG. 1*a* is a diagram of an example of an application scenario. The application scenario in FIG. 1*a* is a cloud game scenario.

The cloud game scenario in FIG. 1*a* includes a client and a server.

For example, a game application and a decoding module are deployed on the client. For example, the game application may provide a human-machine interaction interface for a user to perform a game operation. For example, the decoding module may be configured to decode data (for example, an image or a video), and may be a decoder (for example, a video decoder).

For example, a parsing module, a game logic processing module, a rendering module, an encoding module, and a transmission module are deployed on the server. It should be understood that the server may be an independent server, or may be a server cluster. This is not limited in this application.

For example, the parsing module may be configured to parse indication information.

For example, the game logic processing module may be configured to determine whether rendering is required.

For example, the rendering module may be configured to perform a rendering operation.

For example, the encoding module may be configured to encode data (for example, an image or a video), and may be an encoder (for example, a video encoder).

For example, the transmission module may be configured to transmit an encoded bitstream.

For example, the parsing module, the game logic processing module, the encoding module, and the transmission module may be deployed in a CPU (Central Processing Unit). The rendering module may be a graphics processing unit, or may be deployed in a graphics processing unit. For example, the graphics processing unit is a microprocessor that performs image and graphics-related operations on a personal computer, a workstation, a game console, and some mobile devices (such as a tablet and a smartphone). The graphics processing unit may include a GPU (Graphics Processing Unit).

For example, the parsing module, the game logic processing module, and the transmission module may be deployed in the CPU, and the rendering module and the encoding module may be deployed in the GPU.

Still refer to FIG. 1*a*. A rendering process of a cloud game may be as follows:

S101: The game application receives a user operation.

For example, the user may start the game application in the client as required, and perform various operations in the game application to play a game. Further, the game application may receive the user operation.

S102: The game application sends indication information to the parsing module.

For example, after receiving the user operation, the game application may generate, in response to the user operation, the indication information based on information related to the user operation, and send the indication information to the parsing module in the server.

S103: The parsing module sends a game instruction to the game logic processing module.

For example, after receiving the indication information, the parsing module may parse the indication information to obtain the game instruction. Then, the parsing module sends the game instruction to the game logic processing module.

S104: The game logic processing module sends a rendering instruction to the rendering module.

For example, after receiving the game instruction, the game logic processing module may determine, according to the game instruction, whether rendering is required. If it is determined that rendering is required, the rendering instruction may be generated and sent to the rendering module.

S105: The rendering module sends a rendered image to the encoding module.

For example, after receiving the rendering instruction, the rendering module may perform a rendering operation in response to the rendering instruction, to obtain the rendered image. Then, the rendering module may send the rendered image to the encoding module.

S106: The encoding module sends an encoded bitstream to the transmission module.

For example, after receiving the rendered image, the encoding module may encode the rendered image to obtain the encoded bitstream corresponding to the rendered image; and then send the encoded bitstream to the transmission module.

For example, before rendering the rendered image, the encoding module may first divide the rendered image into a plurality of macroblocks, then divide each macroblock into a plurality of coding blocks, and then perform encoding on a basis of a coding block.

For example, an encoding process of the encoding module is as follows: For each coding block, a pixel value of a pixel in the current coding block may be predicted (that is, intra prediction) by using a pixel value of a pixel in a reconstructed region in a current frame. Alternatively, in a reconstructed image frame, a matched reference coding block is found for the current coding block in a current frame, and a pixel value of a pixel in the reference coding block is used as prediction information of a pixel value of a pixel in the current coding block (this process may be referred to as motion estimation (ME)); and a motion vector (MV) pointing to the reference coding block, and indication information of an image frame in which the reference coding block is located are determined (that is, inter prediction). After the prediction information is obtained through intra or inter prediction, residual information may be obtained by subtracting the corresponding prediction information from the pixel value of the pixel in the current coding block. Then, a method like discrete cosine transform (DCT) is used to transform the residual information, and operations such as quantization and entropy encoding are performed, to encode the coding block, and obtain the encoded bitstream of the coding block.

S107: The transmission module sends the encoded bitstream to the decoding module.

For example, the transmission module performs streaming processing on the encoded bitstream, and sends and transmits streamed data.

For example, the transmission module may obtain the indication information from the parsing module, and parse the indication information to obtain a source address of the client.

For example, the transmission module may alternatively directly obtain the source address of the client from the parsing module.

Then, the transmission module may send the encoded bitstream to the client according to the source address.

S108: The decoding module sends a decoded image to the game application.

For example, after receiving the encoded bitstream, the decoding module may decode the encoded bitstream to obtain the decoded image, and then return the decoded image to the game application.

It should be noted that, because the encoding module encodes (in other words, compresses) the rendered image, image quality deteriorates. Therefore, the decoded image sent by the decoding module to the game application is different from the rendered image sent by, the rendering module to the encoding module.

For example, a decoding process of the decoding module may be as follows: The decoding module first obtains residual information by performing operations such as entropy decoding, dequantization, and inverse transformation, and then determines whether intra predictive encoding or inter predictive encoding is used for a current coding block. If intra predictive encoding is used, prediction information is constructed by using a pixel value of a pixel in a surrounding reconstructed region and according to an intra prediction method used by the encoding module. Alternatively, if inter predictive encoding is used, motion information MV needs to be obtained through parsing, a reference coding block is determined in a reconstructed image by using the motion information MV obtained through parsing, and a pixel value of a pixel in the block is used as prediction information (this process is referred to as motion compensation (MC)). Reconstructed information can be obtained by combining the prediction information and the residual information and performing a filtering operation.

For example, after receiving the decoded image returned by the decoding module, the game application may display the decoded image, to display a game scene (an image or a video) corresponding to the user operation.

Figure 1B:
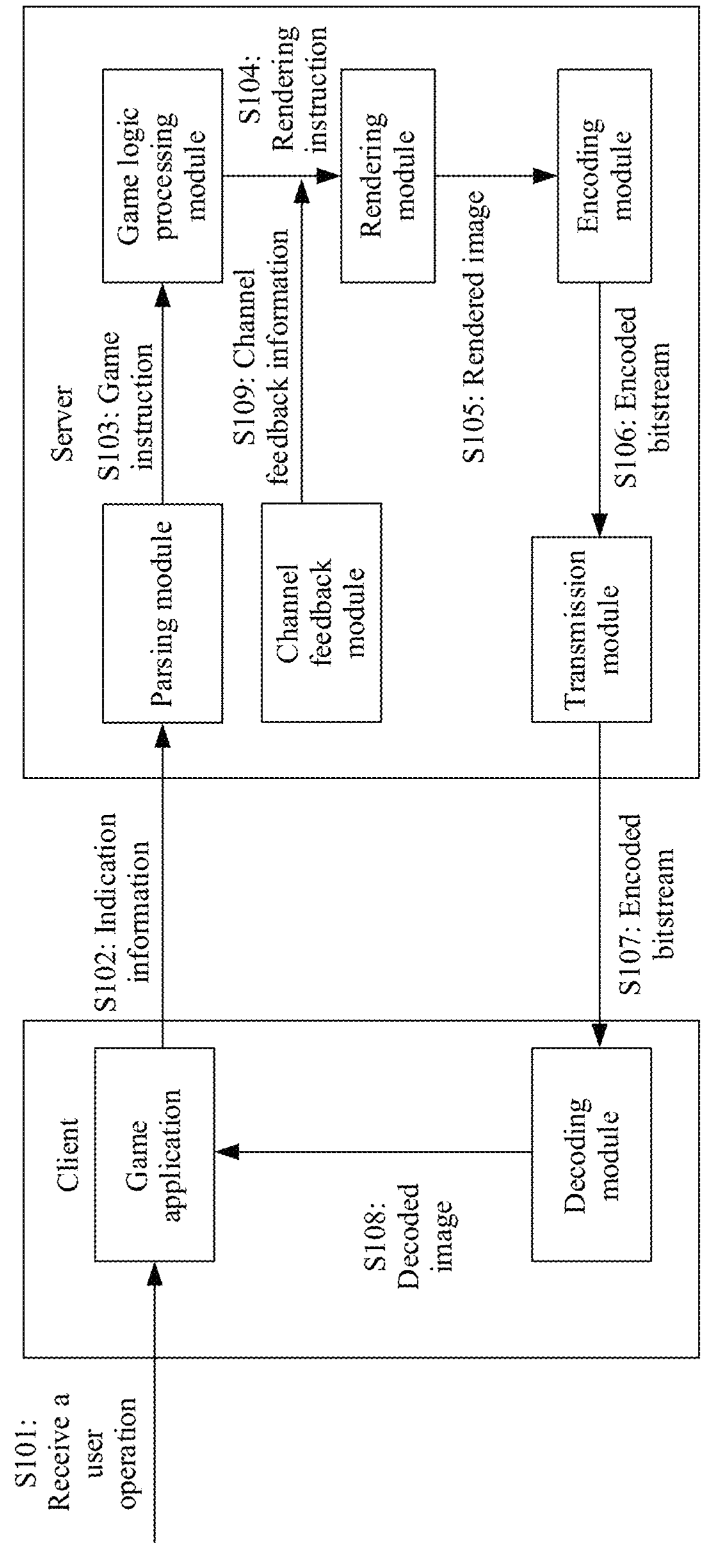
FIG. 1*b* is a diagram of an example of an application scenario.

When a bit rate of the encoded bitstream becomes higher, or a channel status deteriorates due to complex content of a video image, problems such as delay, frame freezing, and frame loss of a video on a device side are caused, or image quality is reduced. To resolve these technical problems, in this application, a channel feedback module may be deployed on the server. As shown in FIG. 1*b*, the channel feedback module may be configured to perform S109, that is, send channel feedback information to the rendering module. For example, S109 may be performed simultaneously with any one of S101 to S108, or may be performed before or after any one of S101 to S108. This is not limited in this application. Optionally, the channel feedback module may send the channel feedback information to the rendering module based on a preset feedback period. The preset feedback period may be set based on a requirement. This is not limited in this application. In this way, after receiving the rendering instruction sent by the game logic processing module, the rendering module may perform rendering based on rendering input information that is selected from a plurality of groups of preset rendering input information and that corresponds to the channel feedback information. Complexity of different groups of preset rendering input information is different, complexity of the preset rendering input information affects content complexity of an image obtained through rendering based on the preset rendering input information, and the content complexity of the image affects a size of an encoded bitstream (that is, higher content complexity of the image indicates a larger, corresponding encoded bitstream, and lower content complexity of the image indicates a smaller corresponding encoded bitstream). In this way, when channel quality decreases, the content complexity of the image is reduced by reducing the complexity of the rendering input information, so that bandwidth required for the encoded bitstream for transmitting the rendered image can be reduced. Further, subjective quality of an original image and video smoothness can be maintained (or maintained as much as possible). In this way, a video image watched by a user does not suddenly become blurry or freeze. This improves user experience. When the channel quality is enhanced, larger bandwidth may be provided to transmit a bitstream, and further, content complexity of an image may be restored or partially restored (or enhanced) by restoring or partially restoring (or enhancing) the complexity of the rendering input information.

For example, each group of preset rendering input information may include at least one of the following: a preset three-dimensional object model, a preset motion model, a preset particle model, or a preset texture. It should be understood that the preset rendering input information may further include other input information that affects the content complexity of the image. This is not limited in this application.

For example, when the preset rendering input information is a model, the preset rendering input information has a plurality of corresponding parameters. For example, when the preset rendering input information is the preset three-dimensional object model, a parameter corresponding to the preset three-dimensional object model may include a quantity of vertices/faces. For another example, when the preset rendering input information is the preset motion model, a parameter corresponding to the preset motion model may include a physical simulation unit granularity. For still another example, when the preset rendering input information is the preset particle model, rendering input information corresponding to the preset particle model may include various particle behavior parameters. In this case, complexity of the preset rendering input information may be determined based on the parameter corresponding to the preset rendering input information. When the preset rendering input information is an image, the complexity of the preset rendering input information may be determined based on image texture complexity.

For example, the content complexity of the image may be a comprehensive representation of factors such as fineness of object details in the image, complexity of object surface texture in the image, motion complexity of an object in the image, and particle motion complexity in the image (this factor exists when the image includes particle special effect).

For example, the motion complexity of the object in the image may be determined based on motion fineness of the object. Higher motion fineness of the object in the image, indicates higher complexity of the object in the corresponding image. On the contrary, lower motion fineness of the object in the image indicates lower complexity of the object in the corresponding image. The motion fineness may refer to a size or a quantity of pixels of a region in which a similar motion or same motion is performed in a local region of an image.

For example, for particle special effect like blooming fireworks or burning flames, the particle motion complexity may be determined based on a particle behavior parameter, and the particle behavior parameter is described subsequently.

For example, it is assumed that there are two video sequences obtained through rendering for a same scene, and for two frames of images corresponding to a same moment in the two video sequences: If complexity of object surface textures in the two frames of images is the same, motion complexity of objects in the images is the same, and particle motion complexity is the same, an image with higher fineness of object details indicates higher content complexity. If fineness of object details in the two images is the same, the motion complexity of the objects in the images is the same, and the particle motion complexity is the same, an image with higher complexity of object surface texture indicates higher content complexity. If the fineness of the object details in the two images is the same, the complexity of the object surface textures is the same, and the particle motion complexity is the same, an image with higher motion complexity of an object in the images indicates higher content complexity. If the fineness of the object details in the two images is the same, the complexity of the object surface textures is the same, and the motion complexity of the objects in the images is the same, an image with higher particle motion complexity indicates higher content complexity.

It should be understood that FIG. 1*a* and FIG. 1*b* are merely examples of this application, and the client in this application has more modules or programs than those shown in FIG. 1*a* and FIG. 1*b*. This is not limited in this embodiment of this application. In addition, the server has more modules than those shown in FIG. 1*a* and FIG. 1*b*. This is not limited in this embodiment of this application. In addition, the parsing module, the game logic processing module, the encoding module, and the transmission module that are deployed in the CPU in FIG. 1*a* and FIG. 1*b* may be a whole, or may be mutually independent modules. In addition, the rendering module and the encoding module that are deployed in the GPU in FIG. 1*a* and FIG. 1*b* may be a whole, or may be mutually independent modules. The channel feedback module in FIG. 1*b* may be integrated into any one of the parsing module, the game logic processing module, the encoding module, the rendering module, and the transmission module, or may be independent of these modules. Certainly, in actual application, the CPU and the GPU in the server may not be divided into modules, but the CPU, the GPU, and the like of the server, jointly complete the foregoing steps. This is not limited in this application.

Figure 2:
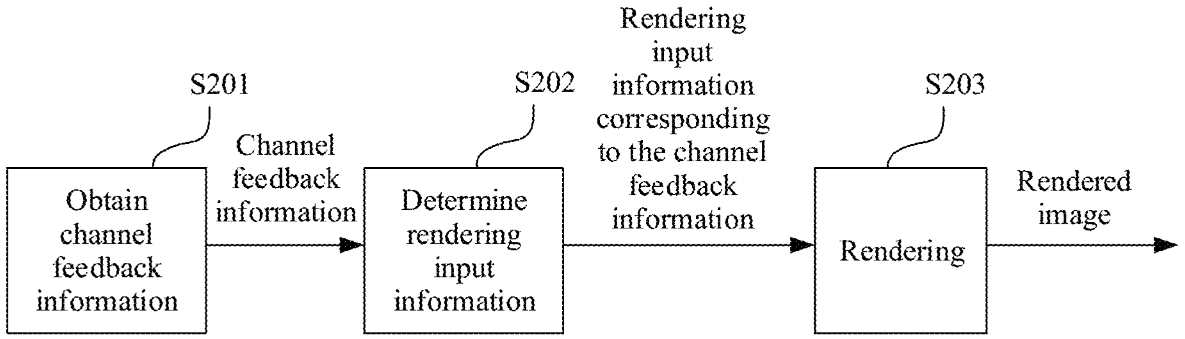
FIG. 2 is a diagram of an example of a rendering process.

FIG. 2 is a diagram of an example of a rendering process.

S201: Obtain channel feedback information of an encoded transmission channel.

For example, the encoded transmission channel may be a channel used to transmit an encoded bitstream corresponding to a rendered image. For example, the encoded transmission channel may be a channel used to transmit the encoded bitstream in S106 and S107 in FIG. 1*a*/FIG. 1*b*.

For example, the channel feedback information includes at least one of the following: network transmission bandwidth, a network transmission delay, a network jitter value, or a network packet loss rate. It should be understood that the channel feedback information may further include other information that affects transmission of the encoded bitstream, for example, an amount of blocked data. This is not limited in this application.

For example, the network transmission bandwidth represents a transmission capability of actually sending data on a channel.

For example, the network transmission delay refers to duration from a time when a bitstream corresponding to a frame starts to be sent to a time when the bitstream is acknowledged to be received or discarded.

For example, the network jitter value refers to a time difference between a maximum network transmission delay and a minimum network transmission delay.

For example, the network packet loss rate refers to a ratio of a quantity of lost data packets to a total quantity of transmitted data packets.

For example, the amount of blocked data is an amount of to-be-sent data or a quantity of frames currently stored in a buffer of a sending device (for example, a server).

S202: Determine, from a plurality of groups of preset rendering input information, rendering input information corresponding to the channel feedback information.

For example, the plurality of groups of preset rendering input information may be pre-stored, complexity of different groups of preset rendering input information is different, and complexity of the preset rendering input information affects content complexity of an image obtained through rendering based on the preset rendering input information. After the channel feedback information is obtained, one group of rendering input information corresponding to the channel feedback information may be searched for from the plurality of groups of preset rendering input information.

For example, a better channel status indicates higher complexity of the determined rendering input information. On the contrary, a worse channel status indicates lower, complexity of the determined rendering input information.

S203: Perform rendering based on the rendering input information corresponding to the channel feedback information, to obtain a rendered image.

For example, after the rendering input information corresponding to the channel feedback information is determined, the rendering input information corresponding to the channel feedback information may be loaded into a three-dimensional scene, and then rendering is performed, to obtain the rendered image.

Further, content complexity of the rendered image is associated with complexity of the rendering input information corresponding to the channel feedback information. To be specific, higher complexity of the rendering input information corresponding to the channel feedback information indicates higher content complexity of the rendered image. Lower complexity of the rendering input information corresponding to the channel feedback information indicates lower content complexity of the rendered image.

In this way, rendering is performed based on the rendering input information whose complexity corresponds to a channel status, so that the content complexity of the rendered image adapts to the channel status, and a size of the encoded bitstream corresponding to the rendered image is adjusted based on a channel status of the encoded bitstream used to transmit the rendered image. In this way, the size of the encoded bitstream corresponding to the rendered image adapts to the channel status. This ensures subjective image quality and video smoothness of a video, and improves user experience.

To facilitate description of a process of determining, from the plurality of groups of preset rendering input information, the rendering input information corresponding to the channel feedback information, the following first describes a rendering process.

Figure 3:
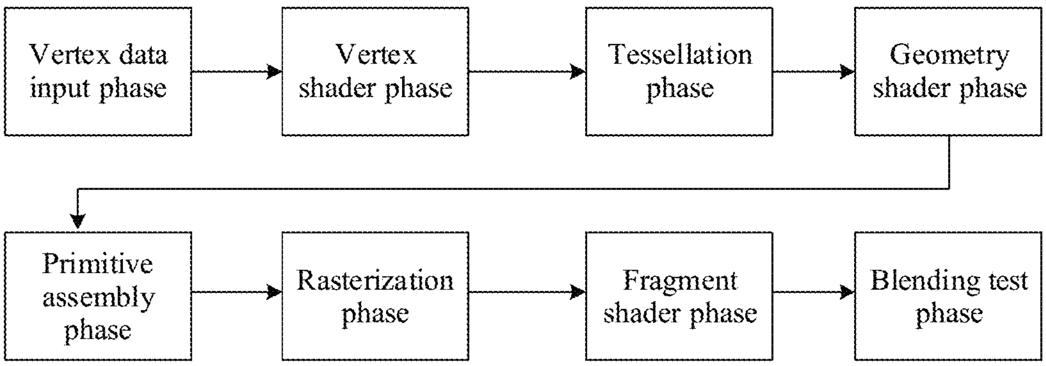
FIG. 3 is a diagram of an example of a rendering procedure.

FIG. 3 is a diagram of an example of a rendering procedure. FIG. 3 is a graphics rendering pipeline for implementing rendering. It should be understood that FIG. 3 is merely an example of a graphics rendering pipeline. The graphics rendering pipeline used to implement rendering in this application may include more or fewer phases than those shown in FIG. 3 or include another phase, or rendering is implemented in another graphics rendering pipeline. This is not limited in this application.

Refer to FIG. 3. For example, the rendering process may include the following plurality of phases: a vertex data input phase, a vertex shader phase, a tessellation phase, a geometry shader phase, a primitive assembly phase, a rasterization phase, a fragment shader phase, and a blending test phase. The tessellation phase and the geometry shader phase may be optional phases.

For example, an operation performed in the vertex data input phase is inputting vertex data. The vertex data may include attribute information of a vertex of a three-dimensional object model (which may also be referred to as a 3D (3-dimensional, three-dimensional) object model), for example, may include: vertex coordinates, texture coordinates, a vertex normal, a vertex color, and a connection relationship between vertices. For example, a 3D scene may be created first, including setting an origin, a light source, a camera location, an observation parameter (for example, a location of a near plane, a location of a far plane, an aspect ratio, and a field of view) of the 3D scene, and the like. Then, the vertex data can be loaded into the created 3D scene. The 3D scene is created in world space.

For example, an operation performed in the vertex shader phase is performing coordinate transformation on the vertex coordinates. For example, the 3D object model is created in model space, and the 3D scene is created in the world space. Therefore, after the 3D model is loaded into the 3D scene, coordinates of each vertex of the 3D object model may be separately changed from the model space to the world space. For example, in the 3D scene, a camera is used as a viewpoint to observe an object in the 3D scene. Therefore, to ensure that all objects in the 3D scene are in a field of view, the vertex coordinates may be changed from the world space to observation space. For example, because only an object located between the near plane and the far plane can be observed, the vertex coordinates may be changed from the observation space to clip space, to clip a viewing frustum formed between the near plane and the far plane by using the camera as a viewpoint.

For example, an operation performed in the tessellation phase is subdividing a triangular face to increase a quantity of triangular faces on a surface of the object.

For example, an operation performed in the geometry shader phase is adjusting a quantity of primitives. For example, a point or a line may be extended to a polygon, or an extension point or a line. The primitive may include a point, a line, a line strip, and a triangular face.

For example, an operation performed in the primitive assembly phase is assembling input vertices into a specified primitive. In the primitive assembly phase, optimization related to clipping and back-face culling is performed to reduce a quantity of primitives in the rasterization phase and accelerate the rendering process.

For example, before the rasterization phase, a screen mapping phase is further entered. Operations performed in the screen mapping phase are perspective division and viewport transform. After the primitive assembly phase and the screen mapping phase, the vertex coordinates are changed to screen space.

For example, an operation performed in the rasterization phase is converting continuous 3D objects into discrete screen pixels.

For example, an operation performed in the fragment shader phase is determining a final color of a pixel on a screen. In this phase, illumination calculation, shadow processing, and texturing are performed.

For example, the test blending phase includes a test phase and a blending phase. The test phase includes a clipping test, an Alpha test (a test), a template test, a depth test, and the like. The blending phase is used to determine, for each pixel, the final color of the pixel based on a result of the clipping test, a result of the Alpha test, a result of the template test, and a result of the depth test.

For example, when a motion process (for example, a water flow) of an object is rendered, physical simulation may be performed based on a motion model corresponding to the object, and then rendering is performed based on a physical simulation result, to obtain a video sequence including a plurality of frames of images, that is, a video sequence corresponding to the motion process of the object. Physical simulation may refer to parameterizing some attributes of an object in the real world, and modeling a feature like a motion of the object in reality with reference to an obtained parameter, to perform various virtual analysis and prediction on the object. For example, when the water flow is rendered, modeling is performed on the water flow, force of each part of the water flow is analyzed, physical simulation is performed with reference to a feature (like viscosity) of water, and then rendering is performed, to simulate dynamic effect close to reality.

It should be noted that, for an object (like a digital human) whose motion status cannot be predicted, rendering may be performed based on a three-dimensional object model corresponding to each moment.

For example, particle rendering is a type of rendering, and is usually used to render various pieces of particle special effect such as smoke, fog, cloud, water, and fire.

For example, for each particle special effect, one video sequence may be obtained through rendering. A process of rendering one frame of image in the video sequence may be as follows:

(1) Generate a particle based on a particle model. The particle model defines a particle behavior parameter. The particle behavior parameter may include but is not limited to: a particle generation speed (used to determine a quantity of particles generated per unit time), a particle initial speed vector (used to describe a motion direction of a particle at each moment), a particle life (that is, a life cycle of particle annihilation), a particle color, a particle size, particle transparency, a change of a particle in a life cycle, and another parameter. Further, a quantity of new particles can be calculated based on the generation speed defined by the particle model and a frame interval of the video sequence, and then the particle is generated in three-dimensional space.

(2) Configure an attribute of each particle based on the particle model. The attribute includes but is not limited to an initial location, an initial speed, an initial size, an initial color, initial transparency, a shape, a life cycle, and the like.

(3) Eliminate a particle that exceeds a lifespan in the three-dimensional space.

(4) Transform and move the remaining particles based on a physical motion model.

(5) Render surviving particles into the frame of image. For example, after the remaining particles are transformed and moved, there are some particles that drift out of an observation region or whose transparency decreases to a specified threshold. These particles that drift out of the observation region or whose transparency decreases to the specified threshold cannot be observed, that is, these particles have no contribution to the image. Therefore, the particles that drift out of the observation region or whose transparency decreases to the specified threshold may be pruned, that is, these particles are eliminated, to obtain the finally surviving particles.

For example, each group of preset rendering input information includes at least one of the following: a preset three-dimensional object model, a preset motion model, a preset particle model, or a preset texture. It should be understood that the preset rendering input information may further include other input information that affects content complexity of a rendered image. This is not limited in this application.

Figure 4A:
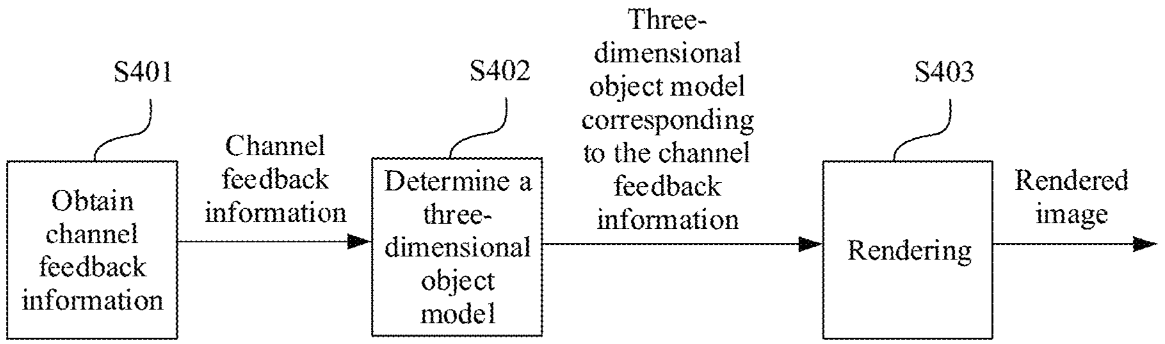
FIG. 4*a* is a diagram of an example of a rendering process.

FIG. 4*a* is a diagram of an example of a rendering process. In an embodiment in FIG. 4*a*, a process of determining, when each group of preset rendering input information includes a preset three-dimensional object model, a three-dimensional object model corresponding to channel feedback information is described.

S401: Obtain channel feedback information of an encoded transmission channel.

For example, network transmission bandwidth in the channel feedback information may be an average value of network transmission bandwidth at a plurality of moments in a preset feedback period, and may be determined according to the following formula:

$$A1 = \frac{1}{N1}\sum_{i=1}^{N1} W'_i$$

$W'_i$ is network transmission bandwidth at an $i^{th}$ moment, N1 is a quantity of, moments included in the preset feedback period, N1 is a positive integer, and A1 is the network transmission bandwidth in the preset feedback period.

For example, a network transmission delay in the channel feedback information may be an average value of network transmission delays at a plurality of moments in a preset feedback period. For example, the network transmission delay may be determined in the following manner:

$$E1 = \frac{1}{N1}\sum_{i=1}^{N1} Y_i$$

E1 is the network transmission delay in the preset feedback period, N1 is a quantity of moments included in the preset feedback period, N1 is a positive integer, and $Y_i$ is a network transmission delay at an $i^{th}$ moment.

For example, a network jitter value may be a difference between a maximum value of the network transmission delay and a minimum value of the network transmission delay in the preset feedback period.

For example, a network packet loss rate may refer to a ratio of an amount of data received by a client to a total amount of data sent by a server in the preset feedback period.

S402: Determine, from a plurality of preset three-dimensional object models, a three-dimensional object model corresponding to the channel feedback information. The plurality of preset three-dimensional object models correspond to a same object, and complexity of the plurality of preset three-dimensional object models is different.

For example, the server stores preset three-dimensional object models corresponding to a plurality of objects (such as flowers, grasses, trees, buildings, tables, chairs, and mountains). For each object, a plurality of preset three-dimensional object models corresponding to the object are stored. In this application, an example in which a plurality of preset three-dimensional object models correspond to one object is used for description.

For example, in the plurality of preset three-dimensional object models corresponding to the object, the preset three-dimensional object models correspond to different complexity.

For example, when the preset three-dimensional object model is a point cloud model (in other words, the preset three-dimensional object model is formed by a point cloud), complexity of the preset three-dimensional object model may be determined based on a quantity of vertices of the preset three-dimensional object model. For example, the quantity of vertices of the preset three-dimensional object model represents the complexity of the preset, three-dimensional object model. For another example, a complexity level is determined based on the quantity of vertices of the preset three-dimensional object model, and the complexity level represents the complexity of the preset three-dimensional object model. This is not limited in this application. A larger quantity of vertices of the preset three-dimensional object model indicates higher complexity of the preset three-dimensional object model and finer preset three-dimensional object model. On the contrary, a smaller quantity of vertices of the preset three-dimensional object model indicates lower complexity of the preset three-dimensional object model and coarser preset three-dimensional object model.

For example, when the preset three-dimensional object model is a face model (in other words, the preset three-dimensional object model is formed by faces), the complexity of the preset three-dimensional object model may be determined based on a quantity of faces. For example, the quantity of faces of the preset three-dimensional object model represents the complexity of the preset three-dimensional object model. For another example, a complexity level is determined based on the quantity of faces of the preset three-dimensional object model, and the complexity level represents the complexity of the preset three-dimensional object model. This is not limited in this application. A larger quantity of faces of the preset three-dimensional object model indicates higher complexity of the preset three-dimensional object model and finer preset three-dimensional object model. On the contrary, a smaller quantity of faces of the preset three-dimensional object model indicates lower complexity of the preset three-dimensional object model and coarser preset three-dimensional object model.

Figure 4B:
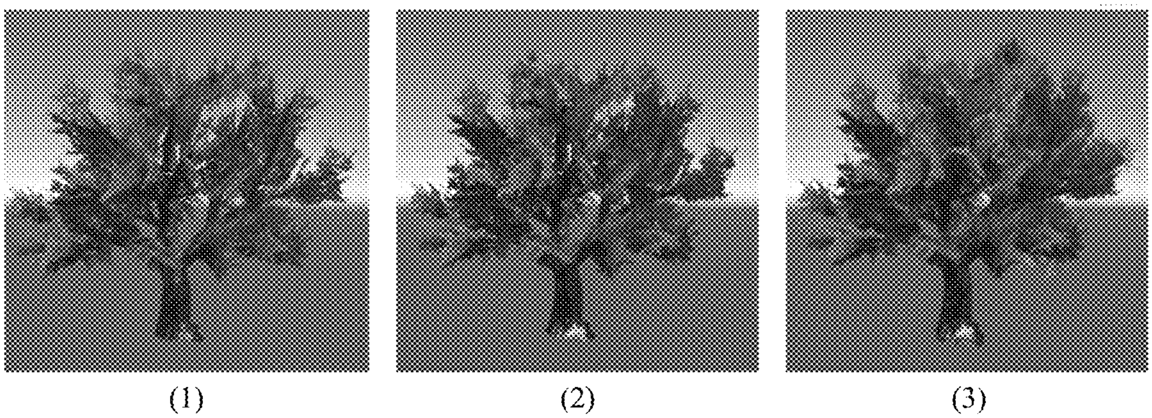
FIG. 4*b* is a diagram of examples of preset three-dimensional object models.

FIG. 4*b* is a diagram of examples of preset three-dimensional object models. (1) in FIG. 4*b*, (2) in FIG. 4*b*, and (3) in FIG. 4*b* show three preset three-dimensional object models corresponding to a same tree, and all the three preset three-dimensional object models are face models. For example, a quantity of faces of the preset three-dimensional object model in (1) in FIG. 4*b* is 30,000, a quantity of faces of the preset three-dimensional object model in (2) in FIG. 4*b* is 70,000, and a quantity of faces of the preset three-dimensional object model in (3) in FIG. 4*b* is 150,000. It can be learned by comparing (1) in FIG. 4*b*, (2) in FIG. 4*b*, and (3) in FIG. 4*b* that complexity of the preset three-dimensional object model in (2) in FIG. 4*b* is greater than complexity of the preset three-dimensional object model in (1) in FIG. 4*b* and complexity of the preset three-dimensional object model in (3) in FIG. 4*b* is greater than the complexity of the preset three-dimensional object model in (2) in FIG. 4*b*.

In a possible manner, for each preset three-dimensional object model, a corresponding preset parameter range may be set based on complexity of the preset three-dimensional object model, and then an association between the preset three-dimensional object, model and the corresponding preset parameter range is established.

In a possible manner, the preset parameter range may include at least one of the following: a network transmission bandwidth range, a network transmission delay range, a network jitter range, or a network packet loss rate range. Higher complexity of the preset three-dimensional object model indicates a larger boundary value of the network transmission bandwidth range, a smaller boundary value of the network transmission delay range, a smaller boundary value of the network jitter range, and a smaller boundary value of the network packet loss rate range in the corresponding preset parameter range. On the contrary, lower complexity of the preset three-dimensional object model indicates a smaller boundary value of the network transmission bandwidth range, a larger boundary value of the network transmission delay range, a larger boundary value of the network jitter range, and a larger boundary value of the network packet loss rate range in the corresponding preset parameter range.

In this way, after the channel feedback information is obtained, the channel feedback information may be compared with preset parameter ranges respectively associated with the preset three-dimensional object models, to select, from the plurality of preset three-dimensional object models, the three-dimensional object model corresponding to the channel feedback information.

For example, if the channel feedback information includes the network transmission bandwidth, the network transmission delay, the network jitter value, and the network packet loss rate, for a preset three-dimensional object model, the network transmission bandwidth included in the channel feedback information may be compared with a network transmission bandwidth range associated with the preset three-dimensional object model, the network transmission delay included in the channel feedback information may be compared with a network transmission delay range associated with the preset three-dimensional object model, the network jitter value in the channel feedback information may be compared with a network jitter range associated with the preset three-dimensional object model, and the network packet loss rate included in the channel feedback information may be compared with a network packet loss rate range associated with the preset three-dimensional object model.

For example, when the network transmission bandwidth included in the channel feedback information belongs to the network transmission bandwidth range associated with the preset three-dimensional object model, the network transmission delay included in the channel feedback information belongs to the network transmission delay range associated with the preset three-dimensional object model, the network jitter value included in the channel feedback information belongs to the network jitter range associated with the preset three-, dimensional object model, and the network packet loss rate included in the channel feedback information belongs to the network packet loss rate range associated with the preset three-dimensional object model, the preset three-dimensional object model may be determined as the three-dimensional object model corresponding to the channel feedback information.

In a possible manner, the preset parameter range may be a channel status range, and a channel status may be represented by channel status indication information determined based on information included in the channel feedback information (for example, represented by using a weighted value of the network transmission bandwidth, the network transmission delay, the network jitter value, and the network packet loss rate, weights of all the information included in the channel feedback information may be set as required, and this is not limited in this application). Higher complexity of the preset three-dimensional object model indicates a larger boundary value of the corresponding channel status range. On the contrary, lower complexity of the preset three-dimensional object model indicates a smaller boundary value of the corresponding channel status range.

In this way, after the channel feedback information is obtained, a weighted value of all information included in the channel feedback information may be calculated, and then the weighted value is compared with channel status ranges respectively associated with the preset three-dimensional object models. When the weighted value belongs to a channel status range, a preset three-dimensional object model associated with the channel status range may be determined as the three-dimensional object model corresponding to the channel feedback information.

In a possible manner, for each preset three-dimensional object model, a complexity level corresponding to the preset three-dimensional object model is identified based on complexity of the preset three-dimensional object model. For example, higher complexity of the preset three-dimensional object model corresponds to a higher complexity level. Then, a complexity level fluctuation value set is determined based on a difference between any two complexity levels of all the complexity levels. For example, FIG. 4*b* includes the three preset three-dimensional object models, a complexity level corresponding to (1) in FIG. 4*b* is L1, a complexity level corresponding to (2) in FIG. 4*b* is L2, and a complexity level corresponding to (3) in FIG. 4*b* is L3. A complexity level fluctuation value set that may be determined includes: +2 (L1→L3), +1 (L1→L2, L2→L3), −1 (L2→L1, L3→L2), −2 (L3→L1). Then, a corresponding channel status change range is set for each complexity level fluctuation value in the complexity level fluctuation value set, and each complexity level fluctuation value is associated with a corresponding channel status change range. For example, a channel status, change range corresponding to a complexity level fluctuation value +1 is [Δ, 2×Δ), a channel status change range corresponding to a complexity level fluctuation value +2 is [2×Δ, 3×Δ), a channel status change range corresponding to a complexity level fluctuation value −1 is (−2×Δ, −Δ), and a channel status change range corresponding to a complexity level fluctuation value −2 is [−3×Δ, −2×Δ), where Δ is a positive number, and may be set based on a requirement. This is not limited in this application. A larger complexity level fluctuation value indicates a larger boundary value of the corresponding channel status change range.

For example, after the channel feedback information is obtained, a channel status change degree may be determined based on channel feedback information obtained this time and channel feedback information obtained last time; and then a target channel status change range within which the channel status change degree falls may be determined. Then, the three-dimensional object model corresponding to the channel feedback information may be determined based on the complexity level fluctuation value associated with the target channel status change degree and the complexity level determined last time. For example, a target complexity level may be determined by a sum of the complexity level fluctuation value associated with the target channel status change degree and the complexity level determined last time; and then a preset three-dimensional object model corresponding to the target complexity level is determined as the three-dimensional object model corresponding to the channel feedback information.

For example, if the channel status change degree determined based on the channel feedback information obtained this time and the channel feedback information obtained last time falls within the channel status change range [Δ, 2×Δ), it may be determined that the complexity level fluctuation value is +1. If a complexity level corresponding to a three-dimensional object model used in previous rendering is L1, a preset three-dimensional object model whose complexity level is L2 may be used as a three-dimensional object model required in current rendering, that is, the three-dimensional object model corresponding to the channel feedback information.

In a possible manner, current channel status indicator information may be calculated based on the current channel feedback information, and previous channel status indicator information may be calculated based on the channel feedback information obtained last time. Then, a difference obtained by subtracting the previous channel status indicator information from the current channel status indicator information is determined as the channel status change degree.

In a possible manner, for each type of information included in the channel feedback information, a difference obtained by subtracting the type of information obtained last time from the type of information obtained this time is calculated is a change value of the type of information. Then, the channel status change degree is determined based on change values of all information included in the channel feedback information.

In this way, when it is determined that three-dimensional object models of a plurality of objects need to be used in this rendering, for each object, the three-dimensional object model corresponding to the channel feedback information may be determined from a plurality of preset three-dimensional object models corresponding to the object with reference to the foregoing description.

S403: Perform rendering based on the three-dimensional object model corresponding to the channel feedback information, to obtain a rendered image.

In a possible manner, a rendering module may first load, in a three-dimensional scene, the three-dimensional object model corresponding to the channel feedback information, and then perform rendering. Further, if the channel feedback information is obtained and the three-dimensional object model corresponding to the channel feedback information is determined in a process of rendering a current frame, when a next frame is rendered, the three-dimensional object model corresponding to the channel feedback information is loaded and then rendered, to obtain a next frame of rendered image. In this way, content complexity of the obtained rendered image is associated with complexity of the three-dimensional object model.

In a possible manner, alternatively, the three-dimensional object model may be generated in the 3D scene at a phase of an image rendering pipeline, and then rendering is performed (in this case, a model parameter of a three-dimensional object model that needs to be generated is input at a vertex data input phase). Further, if the channel feedback information is received and the three-dimensional object model corresponding to the channel feedback information is determined before the three-dimensional object model is generated in the image rendering pipeline, in a process of rendering the current frame in the image rendering pipeline, the three-dimensional object model corresponding to the channel feedback information may be generated, and then rendering is performed, to obtain a current frame of rendered image.

Further, the content complexity of the rendered image is associated with the complexity of the three-dimensional object model corresponding to the channel feedback information. To be specific, higher complexity of the three-dimensional object model corresponding to the channel feedback information indicates higher fineness of object details in the rendered image and higher content complexity of the rendered image. Lower complexity, of the three-dimensional object model corresponding to the channel feedback information indicates lower fineness of object details in the rendered image and lower content complexity of the rendered image.

In this way, rendering is performed based on a three-dimensional object model whose complexity corresponds to a channel status, so that fineness of the object details in the rendered image adapts to the channel status, and a size of an encoded bitstream corresponding to the rendered image adapts to the channel status. This ensures subjective image quality and video smoothness of a video.

In addition, when the complexity of the three-dimensional object model corresponding to the channel feedback information is lower, a quantity of faces/vertices that need to be rendered is smaller, and further, complexity is lower, and a rendering speed is higher. When the complexity of the three-dimensional object model corresponding to the channel feedback information is higher, the object details in the rendered image are finer, so that object details in the image can be increased. This improves user experience.

Figure 5:
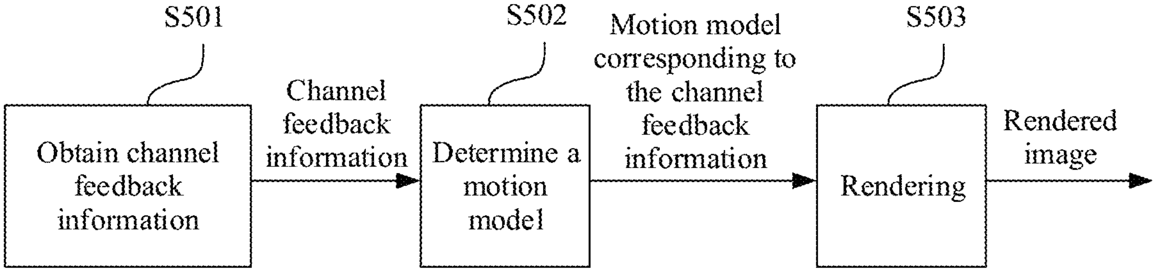
FIG. 5 is a diagram of an example of a rendering process.

FIG. 5 is a diagram of an example of a rendering process. In an embodiment in FIG. 5, a process of determining, when each group of preset rendering input information includes a preset motion model, a motion model corresponding to channel feedback information is described.

S501: Obtain channel feedback information of an encoded transmission channel.

For example, for S501, refer to the foregoing description of S401. Details are not described herein again.

S502: Determine, from a plurality of preset motion models, the motion model corresponding to the channel feedback information. The plurality of preset motion models correspond to a same motion process, and complexity of the plurality of preset motion models is different.

For example, a server stores preset motion models corresponding to a plurality of motion processes (such as a process in which a tree is blown by wind, a process in which water flows, a process in which snow melts, and a process in which a building shakes). For each motion process, a plurality of preset motion models corresponding to the motion process are stored. In this application, an example in which a plurality of preset motion models correspond to one motion process is used for description.

For example, in the plurality of preset motion models corresponding to the motion process, the preset motion models correspond to different complexity.

For example, the preset motion model defines a physical simulation unit granularity. The physical simulation unit granularity is a granularity at which a three-dimensional object model is divided into units used for physical simulation, and a minimum value of the physical simulation unit granularity may be a face or a vertex. For example, the complexity of the preset motion model may be determined based on the physical simulation unit granularity. For example, the complexity of the preset motion model is represented by using the physical simulation unit granularity of the preset motion model. For another example, a complexity level is determined based on the physical simulation unit granularity of the preset motion model, and the complexity level represents the complexity of the preset motion model. This is not limited in this application. For example, a larger physical simulation unit granularity of the preset motion model indicates lower complexity of the preset motion model. On the contrary, a smaller physical simulation unit granularity of the preset motion model indicates higher complexity of the preset motion model. A larger quantity of faces/vertices included in the physical simulation unit granularity indicates a larger physical simulation unit.

For example, an association between each preset motion model and a corresponding preset parameter range is established, or a complexity level corresponding to each motion model is determined, and an association between a complexity level fluctuation value and a channel status change range is established. Then, the motion model corresponding to the channel feedback information is determined, based on the established associations, from the plurality of preset motion models. For details, refer to the description in the embodiment in FIG. 4*a*. Details are not described herein again.

For example, higher complexity of the preset motion model indicates a larger boundary value of a network transmission bandwidth range, a smaller boundary value of a network transmission delay range, a smaller boundary value of a network jitter range, and a smaller boundary value of a network packet loss rate range in the corresponding preset parameter range. On the contrary, lower complexity of the preset motion model indicates a smaller boundary value of the network transmission bandwidth range, a larger boundary value of the network transmission delay range, a larger boundary value of the network jitter range, and a larger boundary value of the network packet loss rate range in the corresponding preset parameter range.

For example, higher complexity of the preset motion model indicates a larger boundary value of a corresponding channel status range. On the contrary, lower complexity of the preset motion model indicates a smaller boundary value of the corresponding channel status range.

For example, higher complexity of the preset motion model corresponds to a higher complexity level.

In this way, when it is determined that a plurality of motion processes need to be rendered this time, for each motion process, the motion model corresponding to the channel feedback information may be determined from a plurality of preset motion models corresponding to the motion process with reference to the foregoing description.

S503: Perform rendering based on the motion model corresponding to the channel feedback information, to obtain a rendered image.

For example, rendering a motion process of an object also obtains a video sequence. Therefore, a process of rendering each frame of the video sequence may be as follows: perform physical simulation on a corresponding three-dimensional object model based on the motion model corresponding to the channel feedback information, to obtain a physical simulation result; and perform rendering based on the physical simulation result, to obtain a frame of image.

It should be noted that, when each frame in a video sequence corresponding to a same motion process is rendered, for a current frame, if a motion model corresponding to channel feedback information determined for the current frame is different from a motion model corresponding to channel feedback information determined for a previous frame, rendering may be performed based on a result of comparing the motion model corresponding to the channel feedback information determined for the current frame with the motion model corresponding to the channel feedback information determined for the previous frame, a frame interval between the current frame and the previous frame, and the motion model corresponding to the channel feedback information determined for the current frame, to obtain the current frame.

For example, if the channel feedback information is obtained and the motion model corresponding to the channel feedback information is determined in a process of rendering the current frame, rendering is performed by using the motion model corresponding to the channel feedback information in a process of rendering the next frame, to obtain a next frame of rendered image.

Further, content complexity of the rendered image is associated with complexity of the motion model corresponding to the channel feedback information. To be specific, higher complexity of the motion model corresponding to the channel feedback information indicates higher motion complexity of an object in the rendered image and higher content complexity of the rendered image. Lower complexity of the motion model corresponding to the channel feedback information indicates lower motion complexity of the object in the rendered image, and lower content complexity of the rendered image.

In this way, rendering is performed based on the motion model whose complexity corresponds to a channel status, so that motion complexity of an object in a rendered video sequence adapts to the channel status. When the motion complexity of the object in the image is lower, inter time domain correlation is higher, inter prediction is easier in an encoding process, compression is easier, and a bit rate of an encoded bitstream is lower. Therefore, a size of an encoded bitstream corresponding to the rendered image adapts to the channel status. This ensures subjective image quality and video smoothness of the video, and improves user experience.

In addition, when the complexity of the motion model corresponding to the channel feedback information is lower, a quantity of physical simulation units that require physical simulation is smaller, rendering complexity is lower, and a rendering speed is higher. In addition, when the complexity of the motion model corresponding to the channel feedback information is higher, the motion complexity of the object in the rendered image is higher, and a motion process of the object displayed in a corresponding video sequence is more realistic. This improves user experience.

Figure 6A:
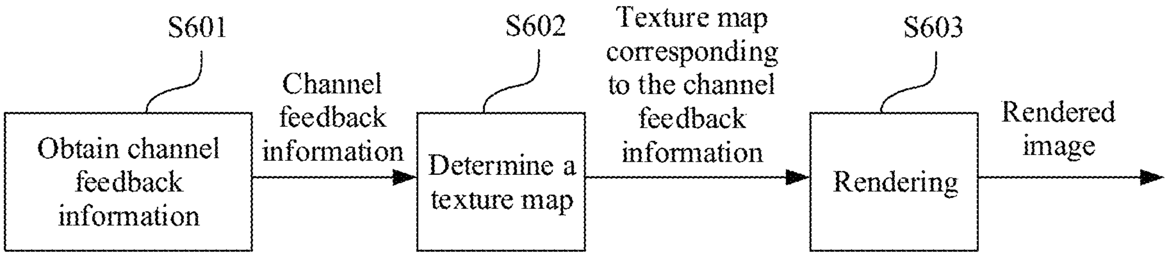
FIG. 6*a* is a diagram of an example of a rendering process.

FIG. 6*a* is a diagram of an example of a rendering process. In an embodiment in FIG. 6*a*, a process of determining, when each group of preset rendering input information includes a preset texture, a texture corresponding to channel feedback information is described.

S601: Obtain channel feedback information of an encoded transmission channel.

For example, for S601, refer to the foregoing description of S401. Details are not described herein again.

S602: Determine, from a plurality of preset textures, a texture corresponding to the channel feedback information. The plurality of preset textures correspond to a same object, and texture complexity of the plurality of preset textures is different.

For example, a server stores preset textures corresponding to a plurality of objects (such as flowers, grass, trees, buildings, tables, chairs, mountains, and carpets). For each object, a plurality of preset textures corresponding to the object are stored. In this application, an example in which a plurality of preset textures correspond to one object is used for description.

For example, in the plurality of preset textures corresponding to the object, different preset textures correspond to different texture complexity. For example, texture complexity of a preset texture may be determined in a plurality of manners. For example, a variance corresponding to an intensity histogram of the preset texture is calculated, and the variance is used to determine the texture complexity of the preset texture (for example, the variance of the preset texture represents the complexity of the preset texture; for another example, a complexity level is determined based on the variance of the preset texture, and the complexity level represents the complexity of the preset texture, and this is not limited in this application). For another example, a gradient of the preset texture is calculated, and the calculated gradient is used to determine the texture complexity of the preset texture (for example, the gradient of the preset texture represents the complexity of the preset texture; for another example, a complexity level is determined based on the gradient of the preset texture, and the complexity level represents the complexity of the preset texture, and this is not limited in this application). It should be understood that the texture complexity of the preset texture may alternatively be determined in another manner. This is not limited in this application.

Figure 6B:
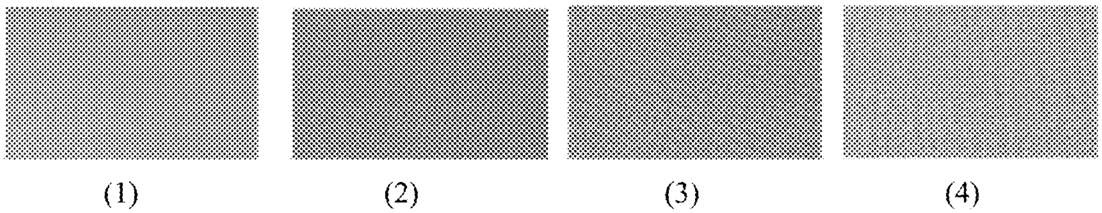
FIG. 6*b* is a diagram of examples of preset textures.

FIG. 6*b* is a diagram of examples of preset textures. FIG. 6*b* shows four preset textures with different texture complexity corresponding to a same carpet. For example, texture complexity of the preset texture in (4) in FIG. 6*b* is greater than texture complexity of the preset texture in (3) in FIG. 6*b*, the texture complexity of the preset texture in (3) in FIG. 6*b* is greater than texture complexity of the preset texture in (2) in FIG. 6*b*, and the texture complexity of the preset texture in (2) in FIG. 6*b* is greater than texture complexity of the preset texture in (1) in FIG. 6*b*.

For example, an association between each preset texture and a corresponding preset parameter range is established, or complexity levels corresponding to various textures are determined, and an association between a complexity level fluctuation value and a channel status change range is established. Then, the texture corresponding to the channel feedback information is determined, based on the established associations, from the plurality of preset textures. For details, refer to the description in the embodiment in FIG. 4*a*. Details are not described herein again.

For example, higher complexity of the preset texture indicates a larger boundary value of a network transmission bandwidth range, a smaller boundary value of a network transmission delay range, a smaller boundary value of a network jitter range, and a smaller boundary value of a network packet loss rate range in the corresponding preset parameter range. On the contrary, lower complexity of the preset texture indicates a smaller boundary value of the network transmission bandwidth range, a larger boundary value of the network transmission delay range, a larger boundary value of the network jitter range, and a larger boundary value of the network packet loss rate range in the corresponding preset parameter range.

For example, higher complexity of the preset texture indicates a larger boundary value of a corresponding channel status range. On the contrary, lower complexity of the preset, texture indicates a smaller boundary value of the corresponding channel status range.

For example, higher complexity of the preset texture corresponds to a higher complexity level.

In this way, when it is determined that three-dimensional object models of a plurality of objects need to be used in this rendering, for each object, the texture corresponding to the channel feedback information may be determined from the plurality of preset textures corresponding to the object with reference to the foregoing description.

S603: Perform rendering based on the texture corresponding to the channel feedback information, to obtain a rendered image.

For example, a process of mapping the three-dimensional object model in a segment shader phase may be as follows: The texture corresponding to the channel feedback information is stored in a memory, and a texture (the texture corresponds to the channel feedback information) of each three-dimensional object model may be read from the memory. For a three-dimensional object model, a pixel that is corresponding to each vertex in the three-dimensional object model and that is on the texture corresponding to the channel feedback information may be determined based on texture coordinates corresponding to each vertex in the three-dimensional object model. Then, each vertex in the three-dimensional object model is colored based on a color of the pixel that is corresponding to each vertex in the three-dimensional object model and that is on the texture corresponding to the channel feedback information. Further, when the channel feedback information is obtained and the texture corresponding to the channel feedback information is determined before mapping is performed on the three-dimensional object model of a current frame, the texture corresponding to the channel feedback information is used to map the three-dimensional object model of the current frame. After the segment shader phase is completed and a test blending phase is completed, a current frame of rendered image may be obtained. When the channel feedback information is obtained and the texture corresponding to the channel feedback information is determined after the three-dimensional object model of the current frame is mapped, the three-dimensional object model of a next frame is mapped by using the texture corresponding to the channel feedback information. After the segment shader phase is completed and the test blending phase is completed, a next frame of rendered image may be obtained.

Further, content complexity of the rendered image is associated with complexity of the texture corresponding to the channel feedback information. To be specific, higher complexity of the texture corresponding to the channel feedback information indicates higher texture complexity of an object surface in the rendered image and higher content complexity, of the rendered image. Lower complexity of the texture corresponding to the channel feedback information indicates lower texture complexity of the object surface in the rendered image and lower content complexity of the rendered image.

In this way, rendering is performed based on the texture whose complexity adapts to a channel status, so that the texture complexity of the object surface in the rendered image adapts to the channel status, and a size of an encoded bitstream corresponding to the rendered image adapts to the channel status. This ensures subjective image quality and video smoothness of a video, and improves user experience.

In addition, when the texture complexity of the texture corresponding to the channel feedback information is lower, rendering complexity is lower, and a rendering speed is higher. When the texture complexity of the texture corresponding to the channel feedback information is higher, complexity of a surface texture of the object in the rendered image is higher. Further, details of a texture of the object in the image can be increased, so that the object in the image is more realistic. This improves user experience.

Figure 7A:
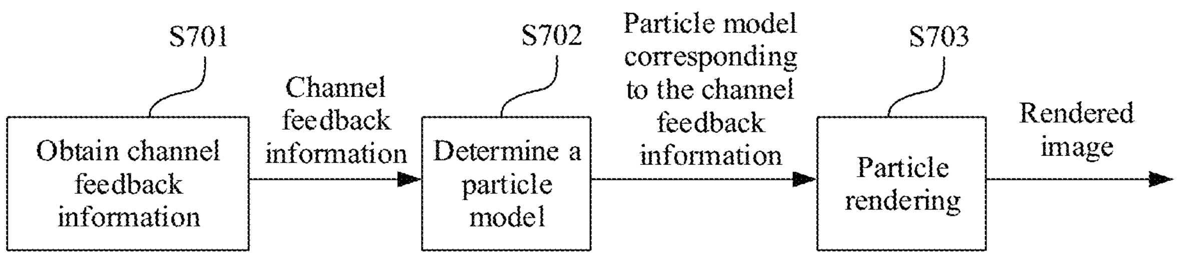
FIG. 7*a* is a diagram of an example of a rendering process.

FIG. 7*a* is a diagram of an example of a rendering process. In an embodiment in FIG. 7*a*, a process of determining, when each group of preset rendering input information includes a preset particle model, a particle model corresponding to channel feedback information is described.

S701: Obtain channel feedback information of an encoded transmission channel.

For example, for S701, refer to the foregoing description of S401. Details are not described herein again.

S702: Determine, from a plurality of preset particle models, a particle model corresponding to the channel feedback information. The plurality of preset particle models correspond to same particle special effect, and complexity of the plurality of preset particle models is different.

For example, a server stores preset particle models corresponding to a plurality of pieces of particle special effect (such as fireworks, fog, flame, and explosion). For each particle special effect, a plurality of preset particle models corresponding to the particle special effect are stored. In this application, an example in which a plurality of preset particle models correspond to one piece of particle special effect is used for description.

For example, in the plurality of preset particle models corresponding to the particle special effect, different preset particle models correspond to different model complexity.

For example, the preset particle model defines a particle behavior parameter. For example, complexity of the particle model may be determined based on the particle behavior, parameter. For example, a quantity of particles in the preset particle model represents complexity of the preset particle model. For another example, a complexity level is determined based on the quantity of particles in the preset particle model, and the complexity level indicates the complexity of the preset particle model. This is not limited in this application. For example, the quantity of particles may be a quantity of particles in space at a moment, and is equal to a maximum quantity of particles that can be displayed in an image. For example, a larger quantity of particles in the preset particle model indicates higher complexity of the preset particle model. On the contrary, a smaller quantity of particles in the preset particle model indicates lower complexity of the preset particle model.

Figure 7B:
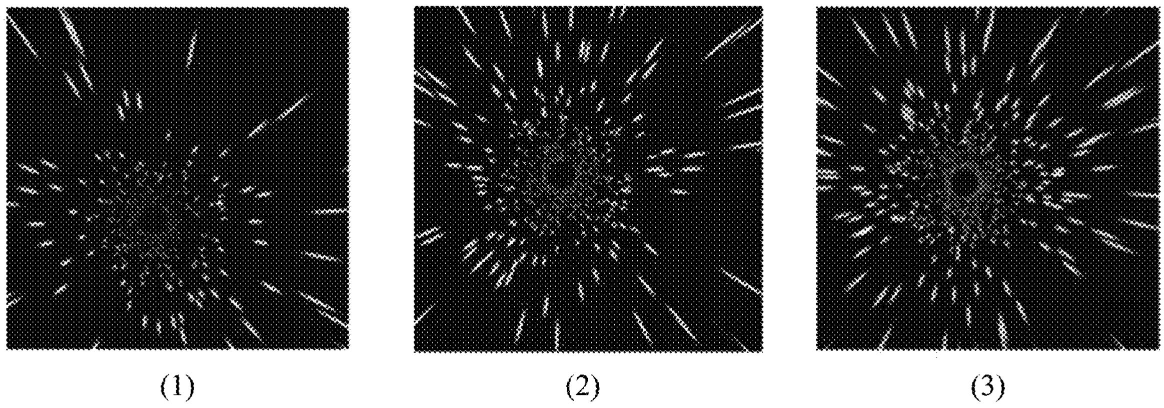
FIG. 7*b* is a diagram of examples of preset particle models.

FIG. 7*b* is a diagram of examples of preset particle models. FIG. 7*b* shows three preset particle models with different complexity corresponding to same particle special effect. For example, a quantity of particles in the preset particle model in (1) in FIG. 7*b* is 300, a quantity of particles in the preset particle model in (2) in FIG. 7*b* is 500, and a quantity of particles in the preset particle model in (3) in FIG. 7*b* is 700. It can be learned by comparing (1) in FIG. 7*b*, (2) in FIG. 7*b*, and (3) in FIG. 7*b* that complexity of the preset particle model in (2) in FIG. 7*b* is greater than complexity of the preset particle model in (1) in FIG. 7*b*, and complexity of the preset particle model in (3) in FIG. 7*b* is greater than the complexity of the preset particle model in (2) in FIG. 7*b*.

For example, an association between each preset particle model and a corresponding preset parameter range is established, or complexity levels corresponding to various particle models are determined, and an association between a complexity level fluctuation value and a channel status change range is established. Then, the particle model corresponding to the channel feedback information is determined, based on the established associations, from the plurality of preset particle models. For details, refer to the description in the embodiment in FIG. 4*a*. Details are not described herein again.

For example, higher complexity of the preset particle model indicates a larger boundary value of a network transmission bandwidth range, a smaller boundary value of a network transmission delay range, a smaller boundary value of a network jitter range, and a smaller boundary value of a network packet loss rate range in the corresponding preset parameter range. On the contrary, lower complexity of the preset particle model indicates a smaller boundary value of the network transmission bandwidth range, a larger boundary value of the network transmission delay range, a larger boundary value of the network jitter range, and a larger boundary value of the network packet loss rate range in the corresponding preset parameter range.

For example, higher complexity of the preset particle model indicates a larger boundary value of a corresponding channel status range. On the contrary, lower complexity of the preset particle model indicates a smaller boundary value of the corresponding channel status range.

For example, higher complexity of the preset particle model corresponds to a higher complexity level.

In this way, when it is determined that a plurality of pieces of particle special effect need to be rendered this time, for each particle special effect, the particle model corresponding to the channel feedback information may be determined from the plurality of preset particle models corresponding to the particle special effect with reference to the foregoing description.

S703: Perform particle rendering based on the particle model corresponding to the channel feedback information, to obtain the rendered image.

For example, when the channel feedback information is obtained and the particle model corresponding to the channel feedback information is determined in a process of rendering a current frame, particle rendering is performed based on the particle model corresponding to the channel feedback information in a process of rendering a next frame, to obtain a next frame of rendered image.

It should be noted that, when each frame in a video sequence corresponding to same particle special effect is rendered, for a current frame, when a particle model corresponding to channel feedback information determined in the current frame is different from a particle model corresponding to channel feedback information determined in a previous frame, a quantity of particles newly generated in the current frame, a particle attribute, and a particle needs to be eliminated are determined based on a result of comparing the particle model corresponding to the channel feedback information determined in the current frame with the particle model corresponding to the channel feedback information determined in the previous frame, a frame interval between the current frame and a next frame, and the particle model corresponding to the channel feedback information determined in the current frame. Then, a surviving particle is rendered into the current frame.

Further, content complexity of the rendered image is associated with complexity of the particle model corresponding to the channel feedback information. To be specific, higher complexity of the particle model corresponding to the channel feedback information indicates higher particle complexity of the rendered image and higher content complexity of the rendered image. Lower complexity of the particle model corresponding to the channel feedback information indicates lower particle complexity of the rendered image and lower content, complexity of the rendered image.

In this way, particle rendering is performed based on the particle model whose complexity adapts to a channel status, so that particle motion complexity in the rendered image adapts to the channel status, and a size of an encoded bitstream corresponding to the rendered image adapts to the channel status. This ensures subjective image quality and video smoothness of a video, and improves user experience.

In addition, when model complexity of the particle model corresponding to the channel feedback information is lower, rendering complexity is lower, and a rendering speed is higher. When the model complexity of the particle model corresponding to the channel feedback information is higher, the particle motion complexity in the rendered image is higher, and a particle motion process displayed in a corresponding video sequence is more realistic, so that particle special effect is more realistic. This improves user experience.

It should be understood that, when each group of preset rendering input information includes any two or more of a preset three-dimensional object model, a preset motion model, a preset texture, and a preset particle model, the foregoing corresponding embodiments may be combined to determine the rendering input information corresponding to the channel feedback information. Then, rendering is performed based on the determined rendering input information to obtain the rendered image. Details are not described herein again.

For example, when a channel status change degree is large, the corresponding rendering input information may be determined based on the channel feedback information. When the channel change degree is small, current rendering input information is determined based on complexity of rendering input information determined last time. In this way, a switching frequency of the rendering input information can be reduced, and a quantity of preset rendering input information can be reduced.

Figure 8:
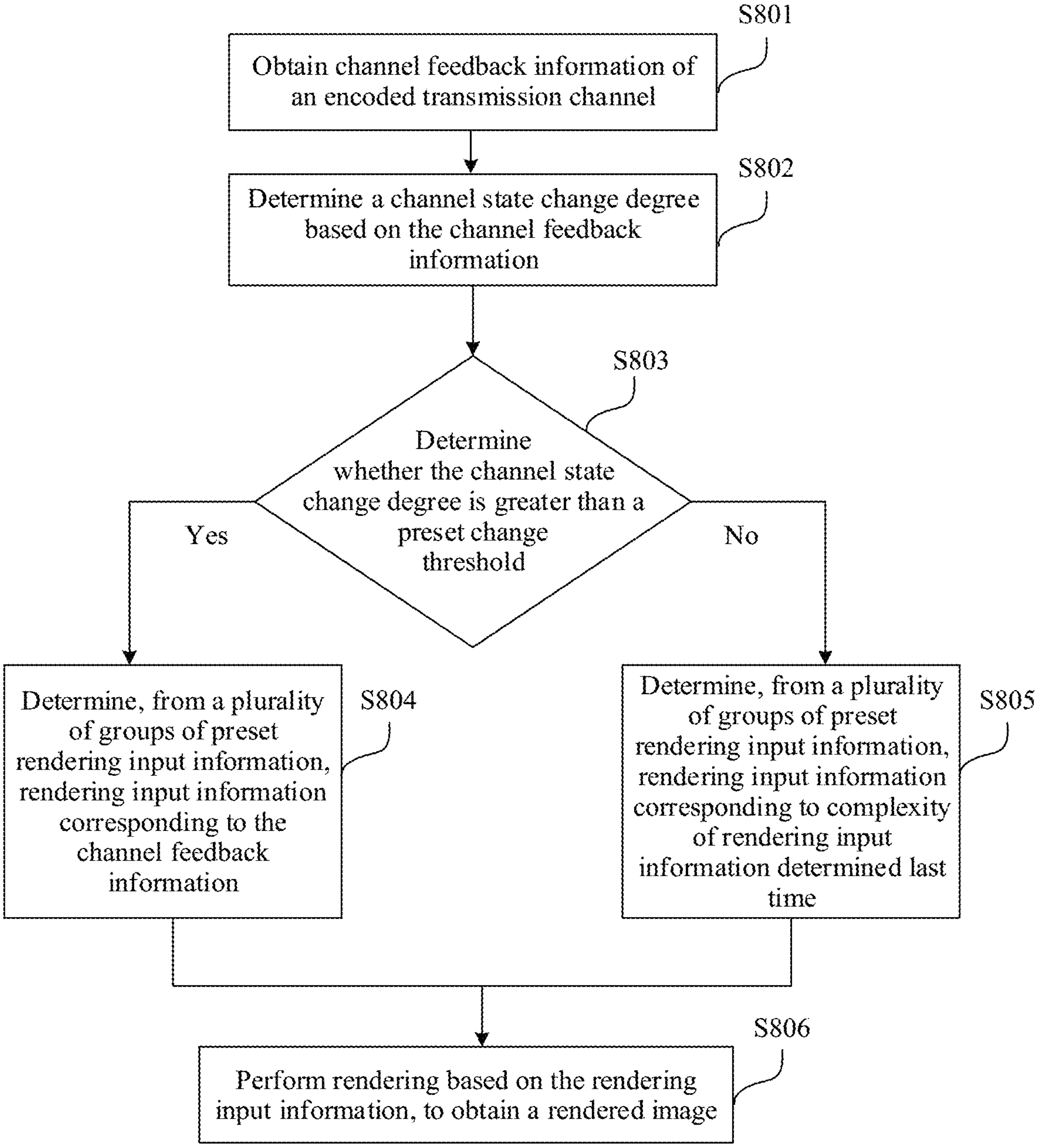
FIG. 8 is a diagram of an example of a rendering process.

FIG. 8 is a diagram of an example of a rendering process.

S801: Obtain channel feedback information of an encoded transmission channel.

For example, for S801, refer to the foregoing description of S401. Details are not described herein again.

S802: Determine a channel status change degree based on the channel feedback information.

For example, the channel status change degree may be determined based on the description of S402. Details are not described herein again.

S803: Determine whether the channel status change degree is greater than a preset change threshold.

For example, the channel status change degree may be compared with the preset change threshold, to determine whether to determine corresponding rendering input information based on the channel feedback information. The preset change threshold may be set based on a requirement. This is not limited in this application. For a process of determining the channel status change degree, refer to the foregoing description. Details are not described herein again.

S804: When the channel status change degree is greater than the preset change threshold, determine, from a plurality of groups of preset rendering input information, rendering input information corresponding to the channel feedback information.

For example, when it is determined that the channel status change degree is greater than the preset change threshold, it may be determined that a channel status change is large. In this case, the corresponding rendering input information may be determined based on the channel feedback information, in other words, the rendering input information corresponding to the channel feedback information is determined from the plurality of groups of preset rendering input information. For S804, refer to the descriptions of S402, S502, S602, and S702. Details are not described herein again.

S805: When the channel status change degree is less than or equal to the preset change threshold, determine, from the plurality of groups of preset rendering input information, rendering input information corresponding to complexity of rendering input information determined last time.

For example, when the channel status change degree is less than or equal to the preset change threshold, it indicates that the channel status change is small. In this case, the corresponding rendering input information may be determined from the plurality of groups of preset rendering input information based on the complexity of the rendering input information determined last time.

For example, the preset rendering input information is a preset three-dimensional object model.

In a possible manner, if a corresponding preset parameter range is set for each preset three-dimensional object model, a preset parameter range associated with a preset three-dimensional object model determined last time may be first determined, and the preset parameter range is used as a reference parameter range. Then, after a target object required for current rendering is determined, for the target object, a preset three-dimensional object model whose associated preset parameter range is the same as the reference parameter range may be searched for from a plurality of preset three-dimensional object models corresponding to the target object. The preset three-dimensional object model is determined as a three-dimensional object model required for the current rendering.

In a possible manner, if a corresponding complexity level is identified for each preset three-dimensional object model, a complexity level associated with a preset three-dimensional object model determined last time may be first determined, and the complexity level is used as a reference level. Then, after a target object required for current rendering is determined, for the target object, a preset three-dimensional object model whose complexity level is the same as the reference level may be searched for from a plurality of preset three-dimensional object models corresponding to the target object. The preset three-dimensional object model is determined as a three-dimensional object model required for the current rendering.

S806: Perform rendering based on the rendering input information, to obtain a rendered image.

For example, for S806, refer to the descriptions of S403, S503, S603, and S703. Details are not described herein again.

In this way, a switching frequency of the rendering input information can be reduced, and a quantity of preset rendering input information can be reduced.

Figure 9:
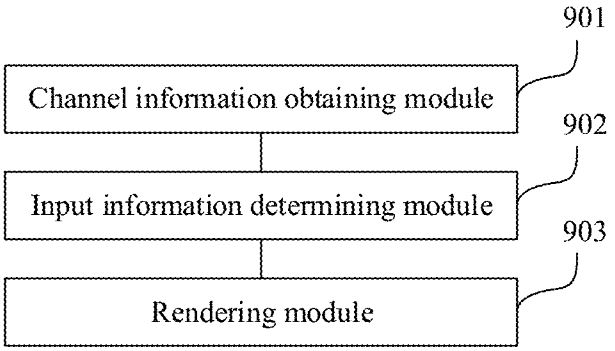
FIG. 9 is a diagram of an example of a rendering apparatus.

FIG. 9 is a diagram of an example of a rendering apparatus, and the rendering apparatus may be configured to perform the method in the foregoing embodiment. Therefore, for beneficial effect that can be achieved by the rendering apparatus, refer to beneficial effect in the corresponding method provided above. Details are not described herein again. In the embodiment of FIG. 9, the rendering apparatus may include:

- a channel information obtaining module 901, configured to obtain channel feedback information of an encoded transmission channel, where the encoded transmission channel is used to transmit an encoded bitstream corresponding to a rendered image;
- an input information determining module 902, configured to determine, from a plurality of groups of preset rendering input information, rendering input information corresponding to the channel feedback information, where complexity of the plurality of groups of preset rendering input information is different; and
- a rendering module 903, configured to perform rendering based on the rendering input information corresponding to the channel feedback information, to obtain the rendered image, where content complexity of the rendered image is associated with complexity of the rendering input information corresponding to the channel feedback information.

It should be noted that the channel information obtaining module 901, the input information determining module 902, and the rendering module 903 all belong to the rendering module shown in FIG. 1*a* and FIG. 1*b*. The channel information obtaining module 901 obtains the channel feedback information of the encoded transmission channel from the channel feedback information module in FIG. 1*b*.

For example, the rendering input information corresponding to the channel feedback information includes at least one of the following: a three-dimensional object model, a motion model, a particle model, and a texture.

For example, the input information determining module 902 is configured to: when each group of preset rendering input information includes a preset three-dimensional object model, determine, from a plurality of preset three-dimensional object models, a three-dimensional object model corresponding to the channel feedback information. The plurality of preset three-dimensional object models correspond to a same object, and complexity of the plurality of preset three-dimensional object models is different.

The rendering module 903 is configured to perform rendering based on the three-dimensional object model corresponding to the channel feedback information, to obtain the rendered image. The content complexity of the rendered image is associated with complexity of the three-dimensional object model corresponding to the channel feedback information.

For example, the preset three-dimensional object model is a face model, and complexity of the preset three-dimensional object model is determined based on a quantity of faces of the preset three-dimensional object model. Alternatively, the preset three-dimensional object model is a point cloud model, and complexity of the preset three-dimensional object model is determined based on a quantity of vertices of the preset three-dimensional object model.

For example, the input information determining module 902 is configured to: when each group of preset rendering input information includes a preset motion model, determine, from a plurality of preset motion models, a motion model corresponding to the channel feedback information. The plurality of preset motion models correspond to a same motion process, and complexity of the plurality of preset motion models is different. The rendering module 903 is configured to perform rendering based on the motion model corresponding to the channel feedback information, to obtain the rendered image. The content complexity of the rendered image is associated with complexity of the motion model corresponding to the channel feedback information.

For example, complexity of the preset motion model is determined based on a physical simulation unit granularity of the preset motion model, and the physical simulation, unit granularity is a granularity at which a three-dimensional object model is divided into units used for physical simulation.

For example, the input information determining module 902 is configured to: when each group of preset rendering input information includes a preset particle model, determine, from a plurality of preset particle models, a particle model corresponding to the channel feedback information. The plurality of preset particle models correspond to same particle special effect, and complexity of the plurality of preset particle models is different. The rendering module 903 is configured to perform particle rendering based on the particle model corresponding to the channel feedback information, to obtain the rendered image. The content complexity of the rendered image is associated with complexity of the particle model corresponding to the channel feedback information.

For example, complexity of the preset particle model is determined based on a particle behavior parameter of the preset particle model.

For example, the input information determining module 902 is configured to: when each group of preset rendering input information includes a preset texture, determine, from a plurality of preset textures, a texture corresponding to the channel feedback information. The plurality of preset textures correspond to a same object, and texture complexity of the plurality of preset textures is different. The rendering module 903 is configured to perform rendering based on the texture corresponding to the channel feedback information, to obtain the rendered image. The content complexity of the rendered image is associated with texture complexity of the texture corresponding to the channel feedback information.

For example, the rendering apparatus further includes a change degree determining module, configured to determine a channel status change degree based on the channel feedback information. The input information determining module 902 is configured to: when the channel status change degree is greater than a preset change threshold, determine, from the plurality of groups of preset rendering input information, the rendering input information corresponding to the channel feedback information. It should be noted that the change degree determining module may belong to the rendering module in FIGS. 1*a* and 1*b*.

For example, the channel feedback information includes at least one of the following: network transmission bandwidth, a network transmission delay, a network jitter value, or a network packet loss rate.

Figure 10:
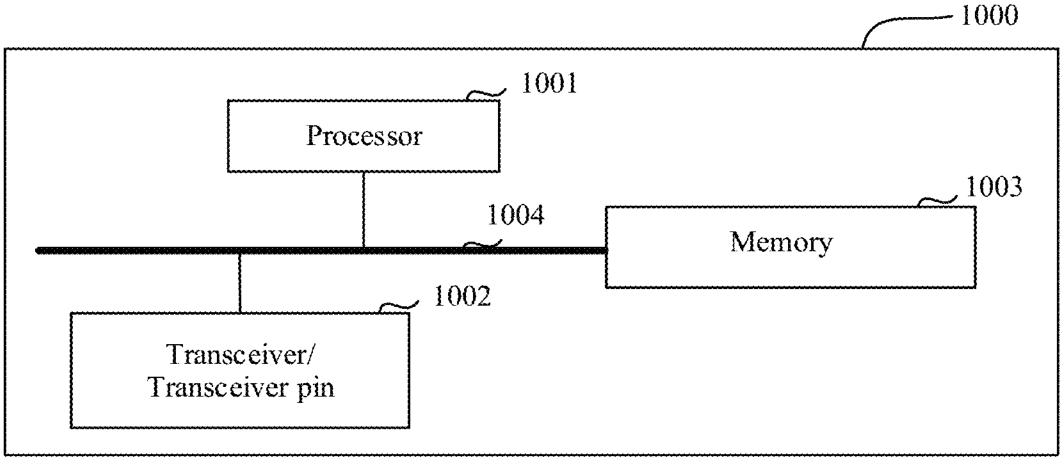
FIG. 10 is a diagram of an example of a structure of an apparatus.

In an example, FIG. 10 is a block diagram of an apparatus 1000 according to an embodiment of this application. The apparatus 1000 may include a processor 1001 and a transceiver/transceiver pin 1002, and optionally, further includes a memory 1003.

Components of the apparatus 1000 are coupled together through a bus 1004. In addition to a data bus, the bus 1004 further includes a power bus, a control bus, and a status signal bus. However, for clear description, various buses are referred to as the bus 1004 in the figure.

Optionally, the memory 1003 may be configured to store instructions in the foregoing method embodiments. The processor 1001 may be configured to: execute instructions in the memory 1003, control a receive pin to receive a signal, and control a transmit pin to send a signal.

The apparatus 1000 may be the electronic device or a chip of the electronic device in the foregoing method embodiments.

All related content of the steps in the foregoing method embodiments may be cited in function descriptions of the corresponding functional modules. Details are not described herein again.

This embodiment further provides a computer-readable storage medium. The computer-readable storage medium stores computer instructions. When the computer instructions are run on an electronic device, the electronic device is enabled to perform the foregoing related method steps to implement the rendering method in the foregoing embodiments.

This embodiment further provides a computer program product. When the computer program product is run on a computer, the computer is enabled to perform the foregoing related steps, to implement the rendering method in the foregoing embodiments.

In addition, an embodiment of this application further provides an apparatus. The apparatus may be a chip, a component, or a module. The apparatus may include a processor and a memory that are connected. The memory is configured to store computer-executable instructions. When the apparatus runs, the processor may execute the computer-executable instructions stored in the memory, to enable the chip to perform the rendering method in the foregoing method embodiments.

The electronic device, the computer-readable storage medium, the computer program product, or the chip provided in embodiments is configured to perform the corresponding method provided above. Therefore, for beneficial effect that can be achieved, refer to the beneficial effect in the corresponding method provided above. Details are not described herein.

Based on the descriptions about the foregoing implementations, a person skilled in the art may understand that, for a purpose of convenient and brief description, division into the foregoing functional modules is used as an example for illustration. In actual application, the foregoing functions may be allocated to different functional modules and implemented based on requirements. In other words, an inner structure of an apparatus is divided into different functional modules to implement all or some of the functions described above.

In several embodiments provided in this application, it should be understood that the disclosed apparatus and method may be implemented in other manners. For example, the described apparatus embodiment is merely an example. For example, division into the modules or the units is merely logical function division and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units, may be located in one place, or may be distributed on different places. Some or all of the units may be selected based on actual requirements to achieve objectives of solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

Any content in embodiments of this application and any content in a same embodiment can be freely combined. Any combination of the foregoing content falls within the scope of this application.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make modifications without departing from the purposes of this application and the protection scope of the claims, and all the modifications shall fall within the protection of this application.

Methods or algorithm steps described in combination with the content disclosed in this embodiment of this application may be implemented by hardware, or may be implemented by a processor by executing a software instruction. The software instruction may include a corresponding software module. The software module may be stored in a random access memory (RAM), a flash memory, a read only memory (ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that enables a computer program to be transmitted from one place to another. The storage medium may be any available medium accessible to a general-purpose or a special-purpose computer.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make modifications without departing from the purposes of this application and the protection scope, of the claims, and all the modifications shall fall within the protection of this application.

What is claimed is:

1. A rendering method, wherein the method is applied to an electronic device and comprises:

obtaining channel feedback information of an encoded transmission channel, wherein the encoded transmission channel is used to transmit an encoded bitstream corresponding to a rendered image;

determining, from a plurality of groups of preset rendering input information, rendering input information corresponding to the channel feedback information, wherein the plurality of groups of preset rendering input information are respectively assigned different rendering levels;

wherein the determining the rendering input information corresponding to the channel feedback information comprises:

determining a channel status change degree based on the channel feedback information obtained currently and channel feedback information obtained previously;

determining a target channel status change range, from a plurality of pre-established channel status change ranges, within which the channel status change degree falls;

determining a level fluctuation value that is pre-associated with the target channel status change range; and determining the rendering input information from the plurality of groups of preset rendering input information by adding the level fluctuation value to a rendering level of rendering input information determined previously; and performing rendering based on the rendering input information corresponding to the channel feedback information, to obtain the rendered image, wherein a size of the encoded bitstream corresponding to the rendered image adapts to the channel feedback information based on the rendering input information determined by the level fluctuation value.

2. The method according to claim 1, wherein the rendering input information corresponding to the channel feedback information comprises at least one of the following: a three-dimensional object model, a motion model, a particle model, or a texture.

3. The method according to claim 1, wherein based on each group of preset rendering input information comprising a preset three-dimensional object model, the determining, from the plurality of groups of preset rendering input information, the rendering input information corresponding to the channel feedback information comprises:

determining, from a plurality of preset three-dimensional object models, a three-dimensional object model corresponding to the channel feedback information, wherein the plurality of preset three-dimensional object models correspond to a single target object, and the plurality of preset three-dimensional object models respectively correspond to the different rendering levels; and wherein the performing the rendering based on the rendering input information corresponding to the channel feedback information, to obtain the rendered image comprises:

performing rendering based on the three-dimensional object model corresponding to the channel feedback information, to obtain the rendered image, wherein the size of the encoded bitstream adapts to the channel feedback information based on the three-dimensional object model.

4. The method according to claim 3, wherein the preset three-dimensional object model is a face model, and the different rendering levels are assigned based on different quantities of faces of the plurality of preset three-dimensional object models; or the preset three-dimensional object model is a point cloud model, and the different rendering levels are assigned based on different quantities of vertices of the plurality of preset three-dimensional object models.

5. The method according to claim 1, wherein based on each group of preset rendering input information comprising a preset motion model, the determining, from the plurality of groups of preset rendering input information, rendering input information corresponding to the channel feedback information comprises:

determining, from a plurality of preset motion models, a motion model corresponding to the channel feedback information, wherein the plurality of preset motion models correspond to a same motion process, and the plurality of preset motion models respectively correspond to the different rendering levels; and wherein the performing the rendering based on the rendering input information corresponding to the channel feedback information, to obtain the rendered image comprises:

performing rendering based on the motion model corresponding to the channel feedback information, to obtain the rendered image, wherein the size of the encoded bitstream adapts to the channel feedback information based on the motion model.

6. The method according to claim 5, wherein the different rendering levels are assigned based on different physical simulation unit granularities of the plurality of preset motion models, and the physical simulation unit granularity is a granularity at which a three-dimensional object model is divided into units used for physical simulation.

7. The method according to claim 1, wherein based on each group of preset rendering input information comprising a preset particle model, the determining, from the plurality of groups of preset rendering input information, the rendering input information corresponding to the channel feedback information comprises:

determining, from a plurality of preset particle models, a particle model corresponding to the channel feedback information, wherein the plurality of preset particle models correspond to a single target particle special effect, and the plurality of preset particle models respectively correspond to the different rendering levels; and wherein the performing the rendering based on the rendering input information corresponding to the channel feedback information, to obtain the rendered image comprises:

performing particle rendering based on the particle model corresponding to the channel feedback information, to obtain the rendered image, wherein the size of the encoded bitstream adapts to the channel feedback information based on the particle model.

8. The method according to claim 7, wherein the different rendering levels are assigned based on different quantities of particles of the plurality of preset particle models.

9. The method according to claim 1, wherein based on each group of preset rendering input information comprising a preset texture, the determining, from the plurality of groups of preset rendering input information, the rendering input information corresponding to the channel feedback information comprises:

determining, from a plurality of preset textures, a texture corresponding to the channel feedback information, wherein the plurality of preset textures correspond to a single target object, and the plurality of preset textures respectively correspond to different intensity histogram variances or different texture gradients; and wherein the performing the rendering based on the rendering input information corresponding to the channel feedback information, to obtain the rendered image comprises:

performing rendering based on the texture corresponding to the channel feedback information, to obtain the rendered image, wherein the size of the encoded bitstream adapts to the channel feedback information based on the texture.

10. The method according to claim 1, further comprising:

determining a channel status change degree based on the channel feedback information; and based on the channel status change degree being greater than a preset change threshold, determining, from the plurality of groups of preset rendering input information, the rendering input information corresponding to the channel feedback information.

11. The method according to claim 1, wherein the channel feedback information comprises at least one of the following:

network transmission bandwidth;

a network transmission delay;

a network jitter value; or a network packet loss rate.

12. A graphics processing unit, configured to perform the rendering method according to claim 1.

13. A rendering apparatus, comprising:

a memory and a processor, wherein the memory is coupled to the processor; and the memory stores program instructions, and upon the program instructions being executed by the processor, the rendering apparatus is enabled to perform the following:

obtaining channel feedback information of an encoded transmission channel, wherein the encoded transmission channel is used to transmit an encoded bitstream corresponding to a rendered image;

determining, from a plurality of groups of preset rendering input information, rendering input information corresponding to the channel feedback information, wherein the plurality of groups of preset rendering input information are respectively assigned different rendering levels; and performing rendering based on the rendering input information corresponding to the channel feedback information, to obtain the rendered image, wherein a size of the encoded bitstream corresponding to the rendered image adapts to the channel feedback information based on the rendering input information determined by a level fluctuation value, wherein the determining the rendering input information corresponding to the channel feedback information comprises:

determining a channel status change degree based on the channel feedback information obtained currently and channel feedback information obtained previously;

determining a target channel status change range, from a plurality of pre-established channel status change ranges, within which the channel status change degree falls;

determining a level fluctuation value that is pre-associated with the target channel status change range; and determining the rendering input information from the plurality of groups of preset rendering input information by adding the level fluctuation value to a rendering level of rendering input information determined previously.

14. The apparatus according to claim 13, wherein the rendering input information corresponding to the channel feedback information comprises at least one of the following: a three-dimensional object model, a motion model, a particle model, or a texture.

15. The apparatus according to claim 13, wherein based on each group of preset rendering input information comprises a preset three-dimensional object model, the processor further executes the program instructions and the rendering apparatus is enabled to determine, from a plurality of preset three-dimensional object models, a three-dimensional object model corresponding to the channel feedback information, wherein the plurality of preset three-dimensional object models correspond to a single target object, and the plurality of preset three-dimensional object models respectively correspond to the different rendering levels; and the processor further executes the program instructions and the rendering apparatus is enabled to perform rendering based on the three-dimensional object model corresponding to the channel feedback information, to obtain the rendered image, wherein the size of the encoded bitstream adapts to the channel feedback information based on the three-dimensional object model.

16. The apparatus according to claim 15, wherein the preset three-dimensional object model is a face model, and the different rendering levels are assigned based on different quantities of faces of the plurality of preset three-dimensional object models; or the preset three-dimensional object model is a point cloud model, and the different rendering levels are assigned based on different quantities of vertices of the plurality of preset three-dimensional object models.

17. The apparatus according to claim 13, wherein based on each group of preset rendering input information comprising a preset motion model, the processor further executes the program instructions and the rendering apparatus is enabled to determine, from a plurality of preset motion models, a motion model corresponding to the channel feedback information, wherein the plurality of preset motion models correspond to a same motion process, and the plurality of preset motion models respectively correspond to the different rendering levels; and the processor further executes the program instructions and the rendering apparatus is enabled to perform rendering based on the motion model corresponding to the channel feedback information, to obtain the rendered image, wherein the size of the encoded bitstream adapts to the channel feedback information based on the motion model.

18. The apparatus according to claim 17, wherein the different rendering levels are assigned based on different physical simulation unit granularities of the plurality of preset motion models, and the physical simulation unit granularity is a granularity at which a three-dimensional object model is divided into units used for physical simulation.

19. A non-transitory computer-readable storage medium, storing a computer program; and upon the computer program being run on a computer or a processor, the computer or the processor is enabled to perform a rendering method including:

obtaining channel feedback information of an encoded transmission channel, wherein the encoded transmission channel is used to transmit an encoded bitstream corresponding to a rendered image;

determining, from a plurality of groups of preset rendering input information, rendering input information corresponding to the channel feedback information, wherein the plurality of groups of preset rendering input information are respectively assigned different rendering levels; and wherein the determining the rendering input information corresponding to the channel feedback information comprises:

determining a channel status change degree based on the channel feedback information obtained currently and channel feedback information obtained previously;

determining a target channel status change range, from a plurality of pre-established channel status change ranges, within which the channel status change degree falls;

determining a level fluctuation value that is pre-associated with the target channel status change range; and determining the rendering input information from the plurality of groups of preset rendering input information by adding the level fluctuation value to a rendering level of rendering input information determined previously; and performing rendering based on the rendering input information corresponding to the channel feedback information, to obtain the rendered image, wherein a size of the encoded bitstream corresponding to the rendered image adapts to the channel feedback information based on the rendering input information determined by the level fluctuation value.

20. The non-transitory computer-readable storage medium according to claim 19, wherein the rendering input information corresponding to the channel feedback information comprises at least one of the following: a three-dimensional object model, a motion model, a particle model, or a texture.

* * * * *